US008370036B2

(12) United States Patent
Ikeda et al.

(10) Patent No.: US 8,370,036 B2
(45) Date of Patent: *Feb. 5, 2013

(54) SHIFT CONTROL DEVICE FOR AUTOMATIC TRANSMISSION AND CONTROL METHOD THEREOF

(75) Inventors: Tomomasa Ikeda, Sagamihara (JP); Hiroki Kawakami, Fuji (JP)

(73) Assignee: JATCO Ltd, Fuji-shi (JP)

( * ) Notice: Subject to any disclaimer, the term of this patent is extended or adjusted under 35 U.S.C. 154(b) by 7613 days.

This patent is subject to a terminal disclaimer.

(21) Appl. No.: 12/236,975

(22) Filed: Sep. 24, 2008

(65) Prior Publication Data
US 2009/0082174 A1 Mar. 26, 2009

(30) Foreign Application Priority Data

Sep. 26, 2007 (JP) ................................. 2007-250245
Sep. 26, 2007 (JP) ................................. 2007-250251
Sep. 26, 2007 (JP) ................................. 2007-250261

(51) Int. Cl.
*B60W 10/10* (2012.01)
(52) U.S. Cl. ............... 701/62; 701/51; 701/64; 701/67; 477/154; 477/155
(58) Field of Classification Search ............ 701/51, 701/60–64, 67; 477/34, 37, 39, 154, 155
See application file for complete search history.

(56) References Cited

U.S. PATENT DOCUMENTS

| 5,823,912 | A | 10/1998 | Fischer et al. | |
|---|---|---|---|---|
| 5,865,708 | A | 2/1999 | Nishio et al. | |
| 5,960,669 | A * | 10/1999 | Ohashi et al. | 74/335 |
| 6,311,122 | B1 | 10/2001 | Higashimata | |
| 6,633,806 | B2 * | 10/2003 | Gochenour | 701/51 |
| 6,637,565 | B2 | 10/2003 | Kwon | |
| 6,645,121 | B2 * | 11/2003 | Wu et al. | 477/98 |
| 6,951,525 | B2 | 10/2005 | Ries-Mueller | |
| 7,933,706 | B2 * | 4/2011 | Ikeda et al. | 701/62 |

(Continued)

FOREIGN PATENT DOCUMENTS

| JP | 61-112850 A | 5/1986 |
|---|---|---|
| JP | 02-009368 U | 1/1990 |

(Continued)

OTHER PUBLICATIONS

T. Ikeda, U.S. PTO Notice of Allowance, U.S. Appl. No. 12/237,026, dated Dec. 29, 2010, 14 pages.

(Continued)

*Primary Examiner* — Thomas Black
*Assistant Examiner* — Peter D Nolan
(74) *Attorney, Agent, or Firm* — Foley & Lardner LLP

(57) ABSTRACT

An automatic transmission calculates a current thermal load state of the frictional element, predicts (S24, S31), prior to the start of the shift, a heat generation amount of the frictional element if the shift is performed in the first shift mode, predicts (S25, S32) a thermal load state of the frictional element upon shift completion on the basis of the current thermal load state of the frictional element and the predicted heat generation amount, and either performs (S28, S38) the shift in a second shift mode, in which a heat generation amount is lower than that of the first shift mode, or prohibits (S39) the shift when the predicted thermal load state upon shift completion is inside a predetermined region.

15 Claims, 22 Drawing Sheets

U.S. PATENT DOCUMENTS

| | | |
|---|---|---|
| 2003/0036837 A1 | 2/2003 | Katayama et al. |
| 2005/0177294 A1* | 8/2005 | Jiang et al. ............ 701/67 |
| 2008/0033618 A1* | 2/2008 | Kwon ................... 701/54 |
| 2008/0096720 A1* | 4/2008 | Watanabe ............. 477/98 |

FOREIGN PATENT DOCUMENTS

| | | |
|---|---|---|
| JP | 03-079856 A | 4/1991 |
| JP | 3402220 B2 | 2/2003 |
| JP | 2005-090308 A | 4/2005 |
| JP | 2005-098431 A | 4/2005 |
| JP | 2006-275227 A | 10/2006 |

OTHER PUBLICATIONS

T. Ikeda, U.S. PTO Notice of Allowance and Allowability; U.S. Appl. No. 12/237,005; dated Jul. 21, 2011, 12 pages.

U.S. Appl. No. 12/237,005, filed Sep. 24, 2008, Ikeda et al.

U.S. Appl. No. 12/237,026, filed Sep. 24, 2008, Ikeda et al.

* cited by examiner

| GEAR POSITION | FRICTIONAL ELEMENTS | | | | |
|---|---|---|---|---|---|
| | FIRST CLUTCH 15 | SECOND CLUTCH 17 | THIRD CLUTCH 19 | FIRST BRAKE 22 | SECOND BRAKE 23 |
| FIRST SPEED | O | | | | |
| SECOND SPEED | O | | | O | |
| THIRD SPEED | O | O | | | |
| FOURTH SPEED | | O | | | O |
| REVERSE RANGE | | | O | O | |

FIG. 3

SHIFT CONTROL DEVICE FOR AUTOMATIC TRANSMISSION AND CONTROL METHOD THEREOF

FIELD OF THE INVENTION

This invention relates to a shift control device for an automatic transmission.

BACKGROUND OF THE INVENTION

In a typical conventional automatic transmission for an automobile, the rotation of an engine is input via a torque converter, varied in speed by a shift mechanism having a plurality of planetary gears, and output to a drive shaft or a propeller shaft (the axle side).

The shift mechanism of this type of automatic transmission executes a shift by transmitting the rotation of an input shaft to a specific gear or carrier of the planetary gear in accordance with a shift position and transmitting the rotation of the specific gear or carrier to an output shaft appropriately. The shift mechanism also comprises a plurality of frictional elements such as clutches and brakes to converge the rotation of the specific gear or carrier appropriately during the shift, and performs a predetermined shift by switching a torque transmission path in accordance with engagement and disengagement combinations of the frictional elements. Hydraulic clutches and brakes, the engagement state of which is controlled through the supply and discharge of oil pressure, are typically employed as the frictional elements.

If a vehicle travels in the vicinity of a boundary region of a vehicle traveling condition when performing a predetermined shift in a conventional automatic transmission, the selected gear position may vary such that the shift is repeated. For example, when performing a 3-4 shift from a third speed to a fourth speed, the 3-4 shift from the third speed to the fourth speed and a 4-3 shift from the fourth speed to the third speed are repeated such that the gear position varies continuously from three to four to three to four and so on.

When shifts are performed continuously in this manner, the same frictional elements are repeatedly engaged and disengaged over a long time period, and therefore the thermal load applied to the frictional elements increases (the temperature increases). As a result, the burns may occur on the frictional elements, leading to eventual burnout. It should be noted that in this specification, "thermal load" is used to mean "temperature" or "heat generation".

In response to this problem, JP3402220B, published by the Japan Patent Office, discloses a technique using a timer. More specifically, a timer is counted down during a continuous shift, and when the timer value reaches a predetermined value, subsequent shifts are prohibited, assuming that the thermal load state (temperature) of the frictional element has reached a burnout temperature. When the continuous shift ends before the timer value reaches the predetermined value, the timer is counted up on a fixed gradient, assuming that heat radiation is underway.

Hence, when the continuous shift resumes immediately after the end of the continuous shift, countdown of the timer value begins from a smaller value than an initial value, and therefore control is executed taking into consideration the amount of accumulated heat in the frictional element.

SUMMARY OF THE INVENTION

However, in the conventional technique described above, only time is used as a parameter, regardless of the type of shift and input torque, and the type of the next shift is not taken into account. The predetermined value of the timer value at which shifts are prohibited is set such that the frictional element is not damaged, irrespective of the type of the next shift. In other words, the predetermined value of the timer value is set at a value having a sufficient margin in relation to a temperature at which damage actually occurs, thereby ensuring that the frictional element is not damaged even if a shift that generates a maximum heat generation amount is performed. Therefore, even when a determined shift would not generate a large amount of heat and the frictional element would not reach the damage temperature if the shift was performed, the shift is prohibited, and as a result, drivability deteriorates.

It is an object of this invention to prevent drivability from deteriorating by improving shift tolerance.

In order to achieve the above object, this invention provides an automatic transmission that comprises a shift mechanism that executes a shift from a current gear position to a target gear position by engaging or disengaging a plurality of frictional elements selectively, a shift control unit which performs the shift in a first shift mode, a current thermal load calculating unit which calculates a current thermal load state of the frictional element, a first heat generation amount predicting unit which predicts, prior to the start of the shift, a heat generation amount of the frictional element if the shift is performed in the first shift mode, and a first thermal load predicting unit which predicts a thermal load state of the frictional element upon shift completion if the shift is performed in the first shift mode on the basis of the current thermal load state of the frictional element and the heat generation amount predicted by the first heat generation amount predicting unit. The shift control unit either performs the shift in a second shift mode, in which a heat generation amount is lower than that of the first shift mode, or prohibits the shift when the thermal load state upon shift completion predicted by the first thermal load predicting unit is inside a predetermined region.

The details as well as other features and advantages of this invention are set forth in the remainder of the specification and are shown in the accompanying drawings.

BRIEF DESCRIPTION OF THE DRAWINGS

FIG. 3 is a view showing the engagement states of frictional elements in each gear position of the shift control device for an automatic transmission according to this embodiment.

DESCRIPTION OF THE PREFERRED EMBODIMENTS

Figure 1:
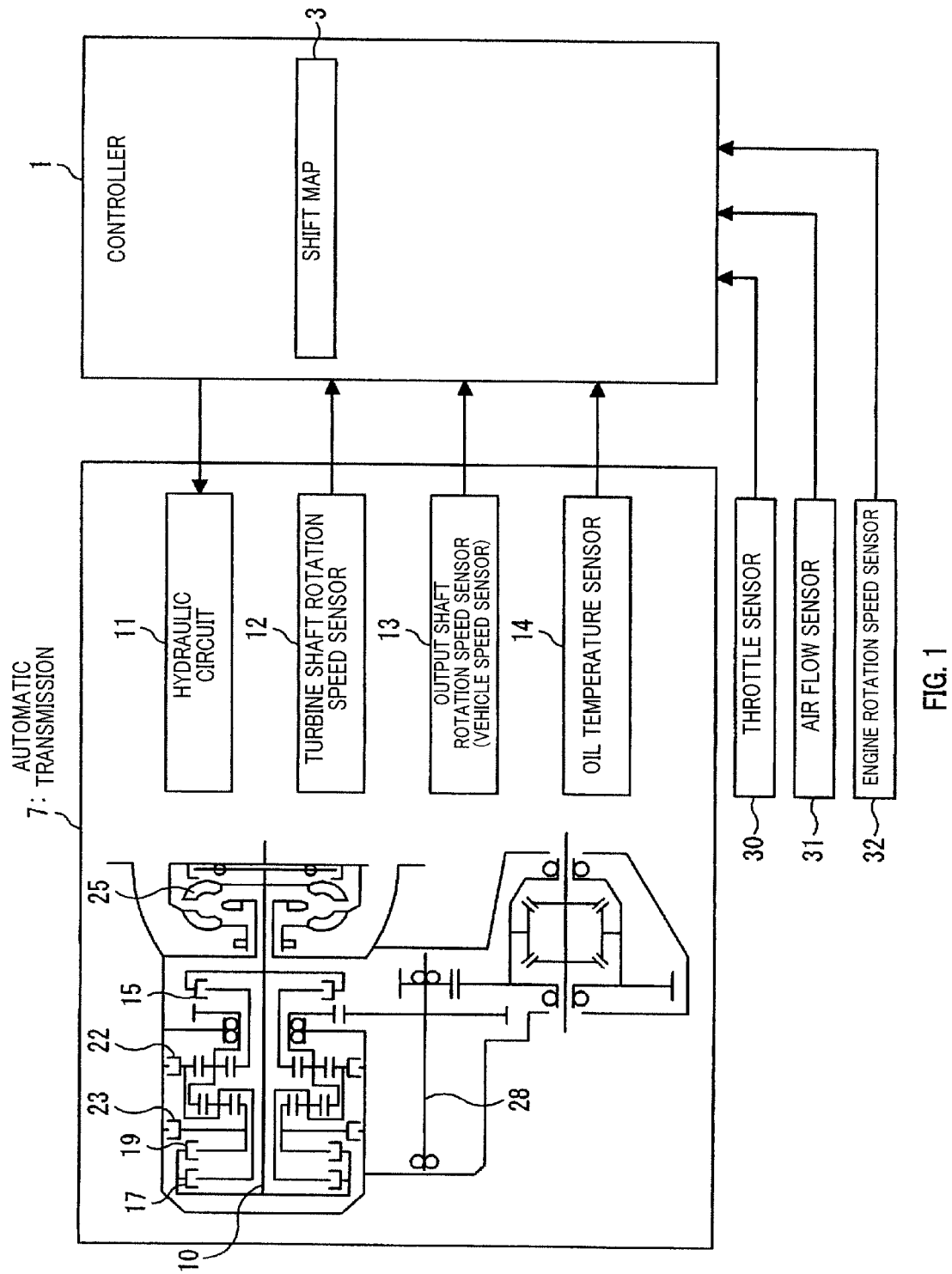
FIG. 1 is a pattern diagram showing the constitution of a shift control device for an automatic transmission according to an embodiment.
Figure 2:
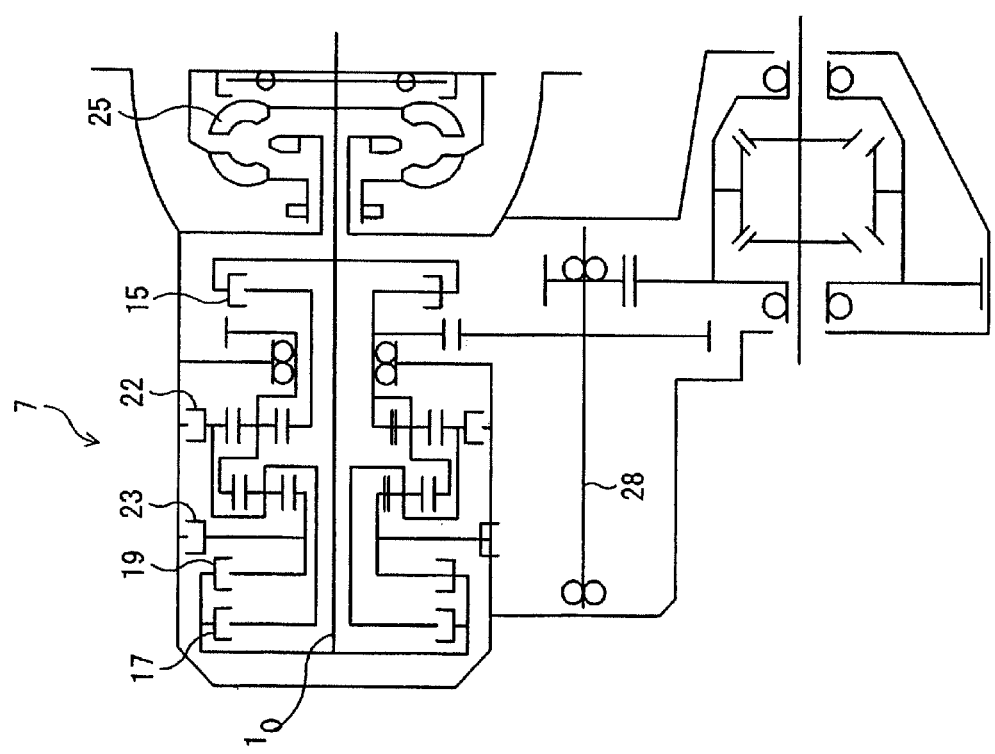
FIG. 2 is a skeleton diagram showing the structure of the automatic transmission according to this embodiment.

An embodiment of this invention will be described in detail below with reference to the figures and so on. FIG. 1 is a functional block diagram showing the constitution of a shift control device for an automatic transmission according to this embodiment. FIG. 2 is a skeleton diagram showing the constitution of the automatic transmission. As shown in FIG. 1, the shift control device comprises a controller 1, various sensors including an input shaft rotation speed sensor (turbine shaft rotation speed sensor) 12 that detects a rotation speed NT of a turbine 25 and a turbine shaft 10, an output shaft rotation speed sensor (vehicle speed sensor) 13 that detects a rotation speed No of an output shaft 28, an oil temperature sensor 14 that detects a temperature of ATF (automatic transmission oil), a throttle sensor 30 that detects a throttle opening of an engine, not shown in the figures, an air flow sensor 31 that detects an intake air amount of the engine, and an engine rotation speed sensor 32 that detects an engine rotation speed NE, and a hydraulic circuit 11 of an automatic transmission 7. Using the controller 1, the shift control device performs shift control to determine a desired target gear position on the basis of detection signals from the aforementioned sensors 12, 13, 14, 30, 31, 32, etc., and to achieve the target gear position via the hydraulic circuit 11.

The gear position of the automatic transmission 7 is determined according to engagement relationships among a planetary gear unit and a plurality of frictional elements, including hydraulic clutches, hydraulic brakes, and so on, provided in the automatic transmission 7. For example, FIG. 1 shows a case in which the automatic transmission 7 has four gear positions, and therefore a first clutch 15, a second clutch 17, a third clutch 19, a first brake 22, and a second brake 23 are provided as the frictional elements. The automatic transmission 7 is shown in detail in FIG. 2. In FIG. 2, reference numerals denoting the respective frictional elements correspond to those in FIG. 1.

The frictional elements 15, 17, 19, 22, 23 are controlled by the controller 1 via the hydraulic circuit 11 shown in FIG. 1. More specifically, a plurality of solenoid valves, not shown in the figures, are provided in the hydraulic circuit 11, and by driving (duty-controlling) these solenoid valves appropriately, ATF delivered from an oil pump is supplied to the frictional elements 15, 17, 19, 22, 23. The controller 1 determines a target gear position on the basis of the throttle opening detected by the throttle sensor 30 and the vehicle speed calculated on the basis of the rotation speed No of the output shaft 28 detected by the output shaft rotation speed sensor 13. The controller then outputs a drive signal (duty ratio signal) to the solenoid valves of the frictional elements 15, 17, 19, 22, 23 that contribute to a shift to the determined target gear position. It should be noted that the pressure of the ATF is regulated to a predetermined oil pressure (line pressure) by a regulator valve not shown in the figures, and ATF regulated to this line pressure is supplied to the hydraulic circuit 11 to activate the respective frictional elements 15, 17, 19, 22, 23.

A shift map 3 is provided in the controller 1. Further, a switch lever (not shown) for switching an operating mode is attached to the automatic transmission 7, and a driver can manually select a shift range, such as a parking range, a traveling range (for example, a first speed to a fourth speed), a neutral range, and a reverse range, by operating the switch lever.

The traveling range includes two shift modes, namely an automatic shift mode and a manual shift mode. When the automatic shift mode is selected, a shift determination is performed in accordance with the shift map 3, which is set in advance on the basis of a throttle opening $\theta_{TH}$ and a vehicle speed V, and a shift is implemented automatically in accordance with this determination. When the manual shift mode is selected, on the other hand, the gear position is shifted to a gear position selected by the driver, regardless of the shift map 3, and fixed thereafter.

Figure 4:
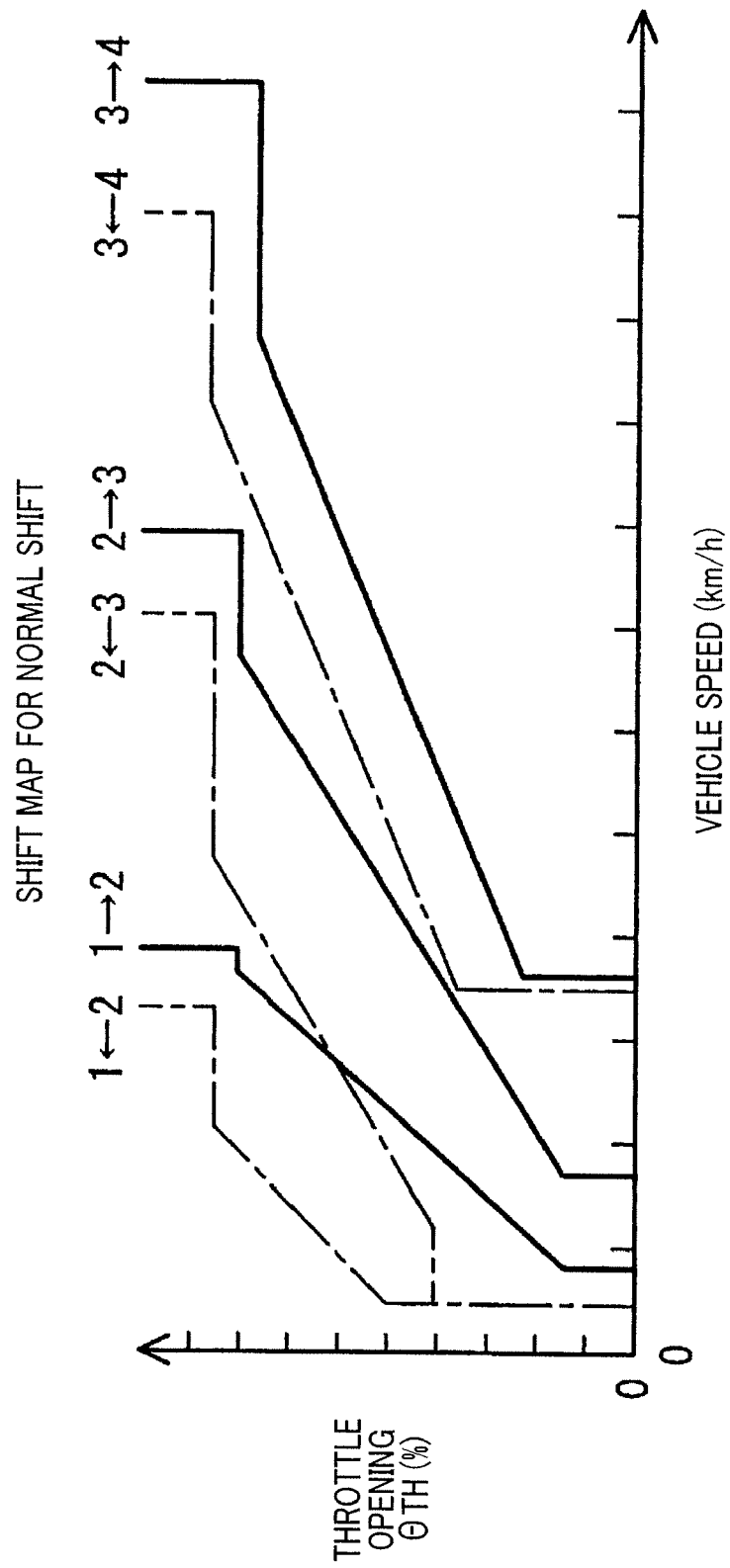
FIG. 4 is a view showing a shift map of the shift control device for an automatic transmission according to this embodiment.

Characteristics such as those shown in FIG. 4, for example, are recorded in the shift map 3. During a normal shift in which the shift is implemented automatically, a target gear position corresponding to the vehicle speed V detected by the vehicle speed sensor 13 and the throttle opening $\theta_{TH}$ detected by the throttle sensor 30 is set on the basis of the shift map 3 shown in FIG. 4. The frictional elements, including the first to third clutches 15, 17, 19 and the first and second brakes 22, 23 described above, are controlled by the solenoid valves set respectively therein, and each gear position is established automatically through engagement and disengagement combinations such as those shown in FIG. 3. In FIG. 3, the circle marks indicate that the corresponding clutch or brake is engaged.

As shown in FIG. 3, when the first clutch 15 and second brake 23 are engaged and the second clutch 17, third clutch 19, and first brake 22 are disengaged, for example, a second speed is reached. A shift from the second speed to a third speed is achieved by disengaging the engaged second brake 23 and engaging the second clutch 17. The engagement state of the frictional elements 15, 17, 19, 22, 23 is controlled by the controller 1, and the gear position is determined according to the engagement relationships among the frictional elements 15, 17, 19, 22, 23. Moreover, shift control is performed while measuring the engagement and disengagement timing appropriately.

During a shift, a drive signal is output to each solenoid valve from the controller 1, and on the basis of the drive signal, the solenoid valve is driven by a predetermined duty value (duty ratio). As a result, optimum shift control is executed so as to provide a favorable shift feeling.

Next, the main parts of this embodiment will be described in detail. The device constantly calculates a current thermal load state (temperature) of each frictional element (to be referred to simply as "clutch" hereafter). When a shift is determined, a temperature increase $T_{INH}$ of the corresponding clutch during the shift is estimated, and on the basis of this result, the shift is either prohibited or permitted.

More specifically, when an operating point crosses an upshift line and a downshift line of the shift map 3 continuously and repeatedly, a 3-4 shift and a 4-3 shift may be performed repeatedly between the third speed and fourth speed, for example, leading to a continuous 3-4-3-4-... shift. A 3-4-3-4-... continuous shift may be performed similarly when the driver switches the shift lever frequently between the third speed and fourth speed.

When a continuous shift is performed in this manner, a specific clutch (in the case of a 3-4 continuous shift, the first clutch 15 and second brake 23; see FIG. 3) is repeatedly engaged and disengaged. When engagement and disengagement are executed repeatedly over a short time period in this manner, the thermal capacity of the clutch increases (the temperature rises), and as a result, burns may occur on the clutch or brake.

Further, when the thermal load state of the clutch is predicted and shifts are prohibited using a timer alone, without taking the type of shift, the engagement/disengagement state, and input torque into consideration, as in the prior art, the precise temperature of the clutch and so on cannot be obtained. Therefore, a threshold for determining that shifts are to be prohibited is set at a value having a sufficient margin to ensure that the clutch does not reach a burnout temperature even when a shift that generates a maximum amount of heat is performed. Accordingly, shifts may be prohibited even in a state where a shift may be permitted, and as a result, drivability is impaired.

Figure 5:
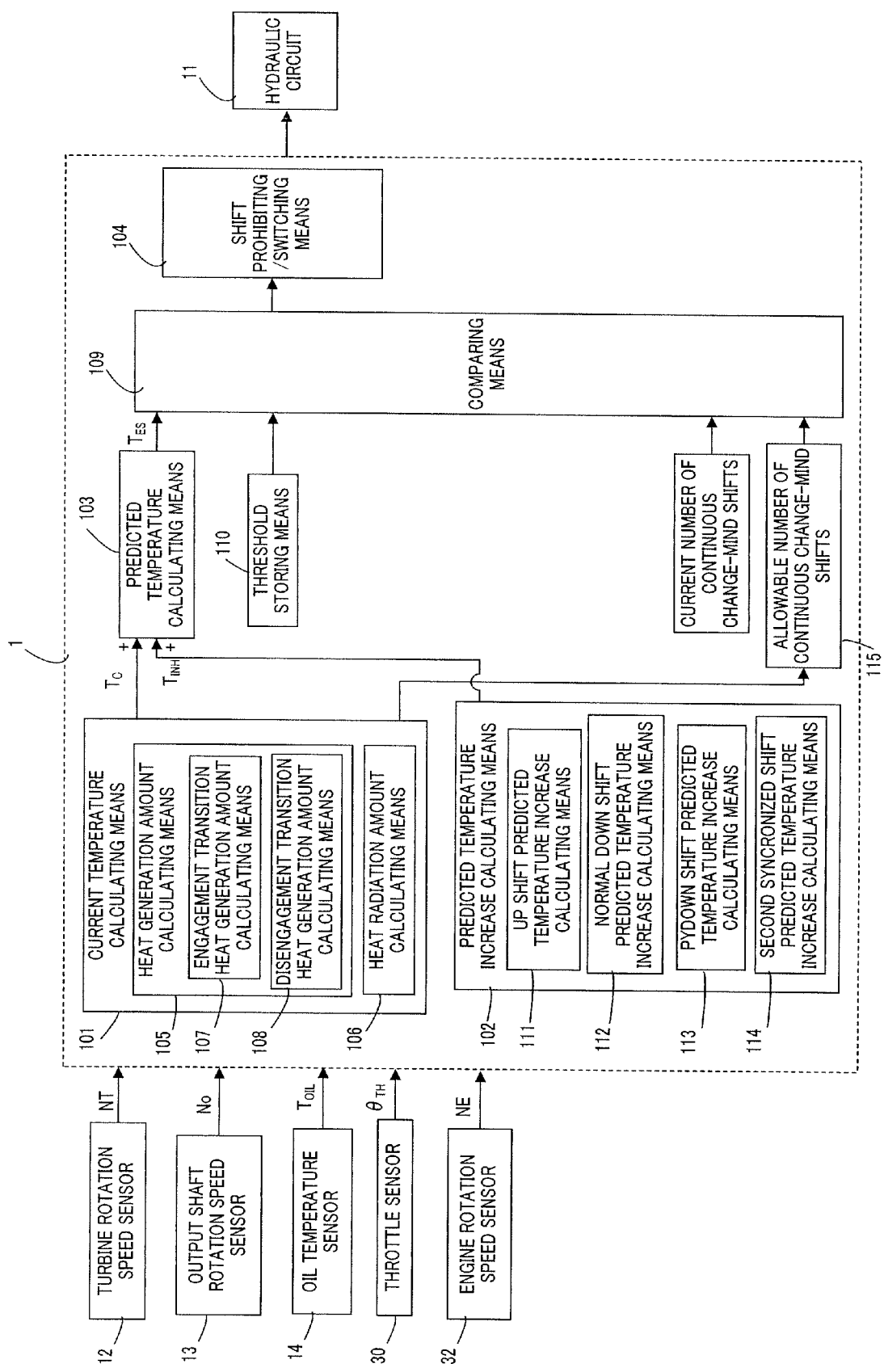
FIG. 5 is a block diagram showing control of the shift control device for an automatic transmission according to this embodiment.

In this embodiment, the thermal load state (current temperature) of each clutch is calculated, and when a shift is determined, the increase in the temperature of the clutch is predicted so that the determination as to whether to prohibit or permit the shift can be made accurately. More specifically, as shown in FIG. 5, the controller 1 includes, in addition to the shift map 3, current temperature calculating means 101 for calculating the current temperature of each clutch, predicted temperature increase calculating means 102 for predicting the temperature increase $T_{INH}$ of the clutch during the next shift, predicted temperature calculating means 103 for determining a predicted temperature $T_{ES}$ of the clutch following the next shift on the basis of the current temperature and predicted temperature increase of the clutch, comparing means 109 for comparing the predicted temperature $T_{ES}$ to a predetermined threshold, and shift prohibiting/switching means 104 for permitting or prohibiting the next shift or switching to another shift on the basis of whether or not the predicted temperature $T_{ES}$ is determined to be equal to or greater than the predetermined value by the comparing means 109.

First, the current temperature calculating means 101 will be described.

The current temperature calculating means 101 successively calculates and updates the current temperature of each clutch, an initial value of which is set at an ATF temperature $T_{OIL}$, obtained from the oil temperature sensor 14, at the time of engine startup. The reason for setting the initial value in this manner is that at the time of engine startup, the temperature of the respective clutches of the transmission 7 may be considered substantially equal to the oil temperature $T_{OIL}$.

Figure 6:
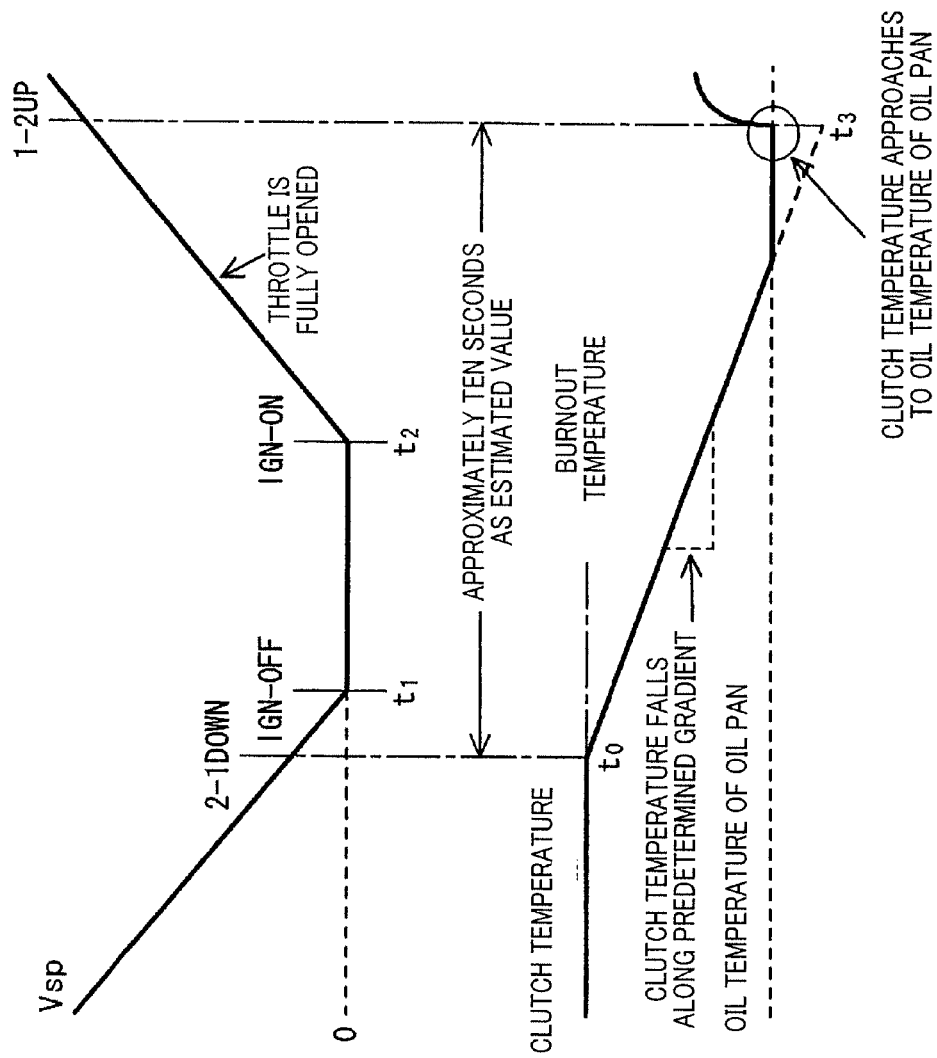
FIG. 6 is a view illustrating a clutch temperature initial value in the shift control device for an automatic transmission according to this embodiment.

FIG. 6 is a diagram verifying the appropriateness of applying the oil temperature $T_{OIL}$ as the initial value of the clutch temperature at the time of engine startup. In the figure, $V_{SP}$ denotes the vehicle speed.

As shown in the figure, the temperature of the clutch (corresponding to the second brake 23 in this embodiment; see FIG. 3) that is engaged when shifting from the first speed to the second speed is intentionally held at a temperature (burnout temperature) at which burns may occur, and in this state, the vehicle speed is reduced along a fixed gradient. Then, when the vehicle speed $V_{SP}=0$ following a downshift to the first speed, the engine is halted by switching an ignition OFF (IGN-OFF) (see t1 in the figure). Following IGN-OFF, the engine is restarted (IGN-ON) (see t2) and an accelerator is fully opened to perform an upshift to the second speed (see t3).

Here, a case in which approximately ten seconds are required between the downshift to the first speed (see t0) and the upshift to the second speed (see t3) was simulated, and it was confirmed that since the clutch temperature decreases gradually along a predetermined gradient from t0, approximately ten seconds are sufficient for the clutch temperature to decrease reliably to approximately the oil temperature $T_{OIL}$ in an oil pan.

Hence, it was confirmed experientially that even when the engine is restarted immediately after being stopped, the clutch temperature approximately reaches the oil temperature $T_{OIL}$, and therefore the oil temperature $T_{OIL}$ may be set as the initial temperature at the time of engine startup.

After setting the initial value of the clutch temperature in the manner described above, the current temperature calculating means 101 calculates a clutch temperature Tc using different methods according to the current state of the clutch. More specifically, the thermal load (heat generation amount $T_{up}$) of the clutch differs between an engaged period and a disengaged period and also between a shift transition period and a steady state period. The thermal load of the clutch also differs between an upshift and a downshift. Therefore, as shown in FIG. 5, the current temperature calculating means 101 includes heat generation amount calculating means 105 for calculating heat generation during a transition between engagement and disengagement of the clutch, and heat radiation amount calculating means 106 for calculating heat radiation during engagement and disengagement steady states. Further, the heat generation amount calculating means 105 is provided with engagement transition heat generation amount calculating means 107 for calculating heat generation during an engagement transition, and disengagement transition heat generation amount calculating means 108 for calculating the heat radiation amount during a disengagement transition.

It should be noted that in this embodiment, an "engagement transition" indicates that a clutch to be engaged is in a torque phase or an inertia phase, while a "disengagement transition" indicates that a clutch to be disengaged is in the torque phase or the inertia phase. Further, an "engagement steady state" indicates that the subject clutch is fully engaged and in neither the torque phase nor the inertia phase, irrespective of whether a shift command has been issued or a shift is not underway. Further, a "disengagement steady state" indicates that the subject clutch is fully disengaged.

Figure 7:
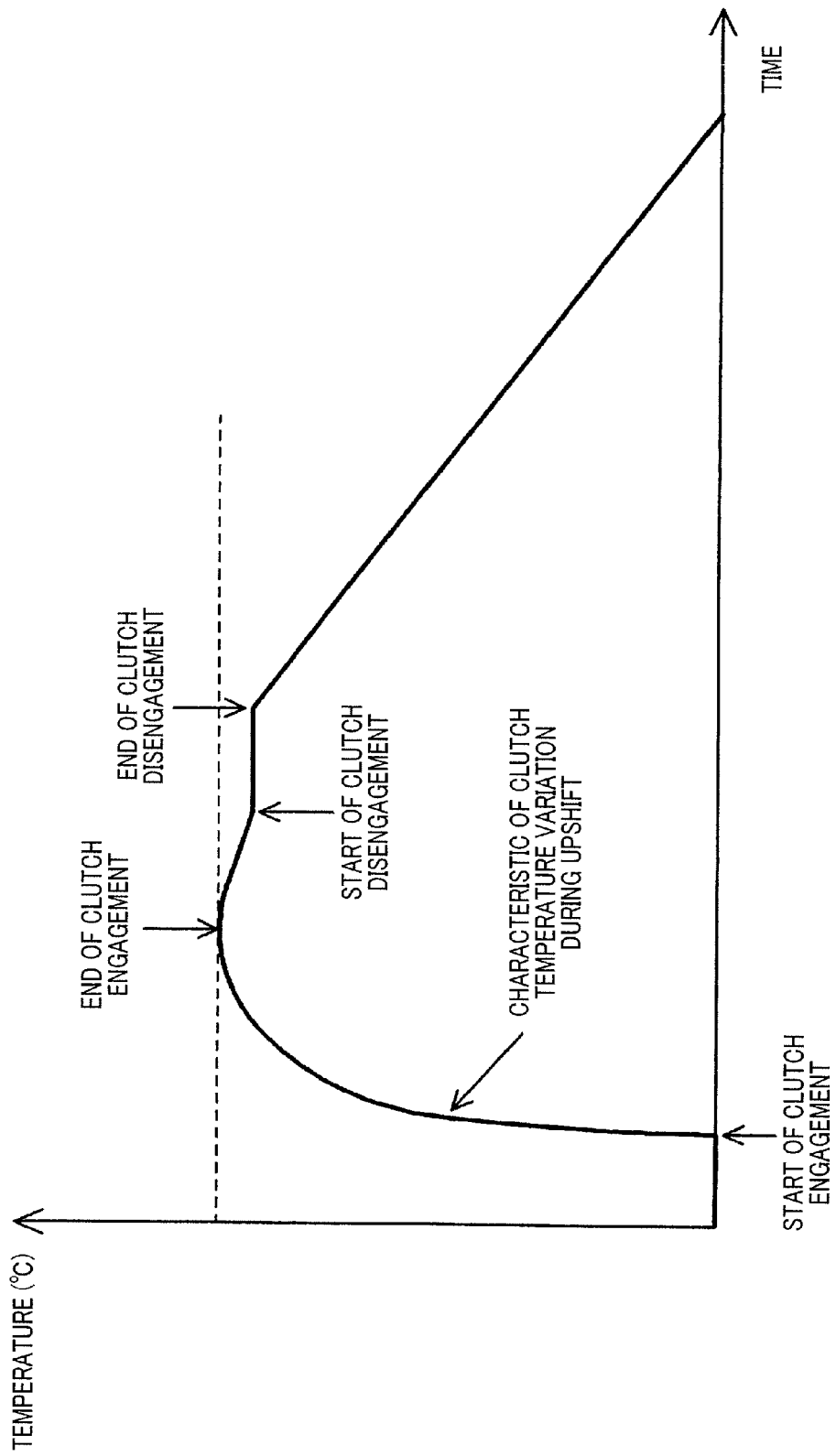
FIG. 7 is a view illustrating a clutch temperature characteristic in the shift control device for an automatic transmission according to this embodiment.

FIG. 7 is a view showing a characteristic of actual temperature variation accompanying engagement and disengagement of the clutch during an upshift. As shown in the figure, the greatest temperature increase occurs between the start of clutch engagement and the end of clutch engagement. Also, the temperature variation gradient is greatest at this time. Once the clutch is engaged and enters a steady state, the temperature decreases along a fixed gradient. When disengagement of the clutch begins, the temperature reduction up to this point and a temperature increase caused by frictional heat that is generated by relative rotation of the clutch cancel each other out such that the temperature becomes substantially constant and variation in the clutch temperature is minute (shown in FIG. 7 as a fixed clutch temperature Tc).

Once disengagement of the clutch is complete (during a disengagement steady state), the temperature falls along a predetermined gradient. At this time, the temperature decrease gradient following clutch disengagement (during the disengagement steady state) is larger (the incline is larger) than the temperature decrease gradient following clutch engagement (during the engagement steady state).

Hence, the current temperature calculating means 101 calculates the clutch temperature Tc taking into account this temperature variation characteristic. Calculation of the clutch temperature Tc by the current temperature calculating means 101 will now be described specifically. On the basis of information from the shift map 3, the current temperature calculating means 101 inputs the current gear position, as well as the target gear position when a shift is determined. The turbine rotation speed NT and engine rotation speed NE are also input into the current temperature calculating means 101 from the turbine rotation speed sensor 12 and the engine rotation speed sensor 32.

Of the plurality of clutches, the clutches that are in the engagement steady state or the disengagement steady state do not come into sliding contact with each other while still having capacity as a result of being in a steady state, and therefore frictional heat is not generated in the clutches and the temperature thereof does not rise. Hence, the heat radiation amount is calculated by the heat radiation amount calculating means 106. Here, when a shift operation by the transmission 7 is not underway, the clutches in the engagement steady state or the disengagement steady state correspond to all of the clutches, and when a shift operation is underway, the clutches in the engagement steady state or the disengagement steady state correspond to the clutches that do not contribute to the shift operation, for example the third clutch 19 and first brake 22 during a shift from the second speed to the third speed.

The heat radiation amount calculating means 106 calculates a heat radiation amount (temperature reduction margin) $T_{down}$ on the basis of the following Equations (1) and (2). It should be noted that in the control of the controller 1, the heat generation amount $T_{up}$ is treated as + and the heat radiation amount is treated as −, and therefore, in the following Equations (1) and (2), the heat radiation amount $T_{down} < 0$.

Engaged state:

$$T_{down} = -A \times t_c (t \leq t1), \ T_{down} = -B \times t_c (t1 \leq t) \quad (1)$$

In Equation (1), A is a variable, B is a constant, $t_c$ is an interval, t is an elapsed time following shift completion, and t1 is a predetermined time period.

Disengaged state:

$$T_{down} = -C \times t_c (t \leq t1), \ T_{down} = -D \times t_c (t1 \leq t) \quad (2)$$

In Equation (2), C is a variable, D is a constant, $t_c$ is the interval, t is the elapsed time following shift completion, and t1 is the predetermined time period.

More specifically, the heat radiation amount calculating means 106 calculates the heat radiation amount $T_{down}$ assuming that between the achievement of a steady state following completion of the shift and the elapse of the predetermined time period t1, the clutch temperature Tc decreases along gradients A and C, which are variables, and calculates the heat radiation amount $T_{down}$ assuming that after the elapse of the predetermined time period t1 from completion of the shift, the clutch temperature Tc decreases along gradients B and D, which are constants. The variables A and C are values determined on the basis of a temperature difference between the current clutch temperature Tc and the oil temperature $T_{OIL}$, and are set such that the gradient increases as the temperature difference increases. Further, the constant gradients B, C are set such that B>C, and such that the temperature decreases along a sharper gradient in the disengagement steady state, as shown in FIG. 7. The reason for this is that in the disengagement steady state, it is easier to supply lubricating oil to a facing surface of the clutch than in the engagement steady state, and as a result, greater heat radiation can be performed.

By adding the currently calculated heat radiation amount $T_{down}$ to the previously calculated current clutch temperature Tc, the new current clutch temperature Tc is calculated.

When the clutch is in the engagement steady state or the disengagement steady state, the clutch temperature Tc falls along a predetermined gradient, as shown in Equations (1) and (2), and therefore, when the calculation subject clutch remains in a steady state for a long time, a temperature that is not possible in reality (for example, a lower temperature than the oil temperature $T_{OIL}$) is calculated erroneously.

Therefore, the heat radiation amount calculating means 106 is provided with a function for resetting calculation of the heat radiation amount $T_{down}$ using the Equations (1) and (2) (or clipping a lower limit value thereof) when the clutch remains in the engagement steady state or the disengagement steady state for a predetermined time period. In other words, a reset determination timer, not shown in the figures, is provided in the heat radiation amount calculating means 106, and when it is determined that the engagement steady state or disengagement steady state has begun, the timer starts to count.

When the clutch is in the engagement steady state or the disengagement steady state and the timer count indicates that this state has remained unchanged for a predetermined time period, calculation of the clutch temperature Tc based on the Equations (1) and (2) is canceled. Furthermore, in this case, the clutch temperature Tc should have decreased sufficiently to be equal to the oil temperature $T_{OIL}$, and therefore the clutch temperature Tc is matched to the current oil temperature $T_{OIL}$ thereafter.

Further, if the current clutch temperature Tc falls to or below the oil temperature $T_{OIL}$ even though the timer count has not exceeded the predetermined time period, clutch temperature Tc=oil temperature $T_{OIL}$ is set thereafter.

On the other hand, if the state of the clutch shifts to an engagement transition or a disengagement transition within the predetermined time period following the start of the timer count, the timer is reset such that the count returns to its initial value. Then, when the clutch returns to a steady state from the transition state, counting is started from the initial value.

Figure 8:
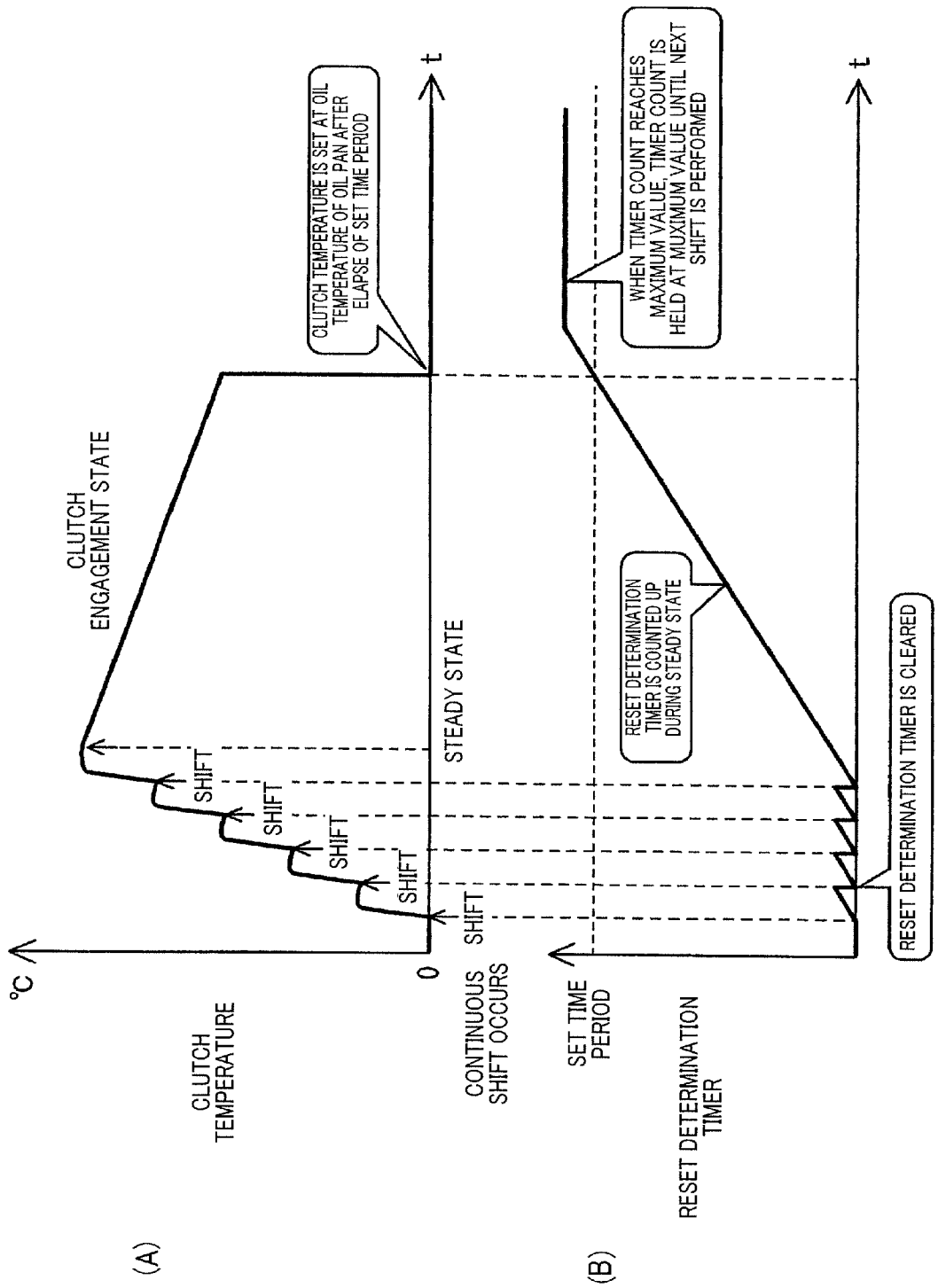
FIG. 8 is a view illustrating a reset determination timer of the shift control device for an automatic transmission according to this embodiment.

Here, using FIG. 8, an action of the reset determination timer when a continuous shift is performed between an $N^{th}$ speed and an $N+1^{th}$ speed will be described, FIG. 8A is a view illustrating variation in the clutch temperature Tc, and FIG. 8B is a view illustrating the count of the reset determination timer.

As shown in FIG. 8A, when a continuous shift occurs, the clutch temperature Tc rises every time the clutch is engaged. It should be noted that the clutch temperature Tc decreases when the clutch is in the engagement steady state or the disengagement steady state, but when a continuous shift is performed over a short time period, the temperature decrease is smaller than the temperature increase during the clutch engagement transition.

Meanwhile, as shown in FIG. 8B, the timer count is reset every time a shift is begun (during a transition). In this example, the timer count continues when the clutch shifts to the engagement steady state. When the timer count reaches a predetermined value, as shown in FIG. 8A, it is determined thereafter that the clutch temperature Tc has fallen to the oil temperature $T_{OIL}$, and therefore the clutch temperature Tc is set at the oil pan temperature $T_{OIL}$. Further, the timer count is held at a set value or a maximum value set at a larger value than the set value.

Next, calculation of the temperature (generated heat) of the clutch during an engagement transition or a disengagement transition will be described.

In this case, the current temperature of the clutch is calculated periodically by the heat generation amount calculating means 105. First, when the clutch is determined to be in a transition state on the basis of information from the turbine rotation speed sensor 12 and so on, the heat generation amount calculating means 105 determines whether the clutch is in an engagement transition state or a disengagement transition state.

When it is determined that the clutch is in an engagement transition state (for example, the second clutch 17 during a 2→3 shift), the engagement transition heat generation amount calculating means 107 provided in the heat generation amount calculating means 105 calculates the heat generation amount $T_{up}$ of the clutch.

On the basis of information from the shift map 3, the engagement transition heat generation amount calculating means 107 determines whether the current shift is an upshift or a downshift. When the clutch is in an engagement transition state, the heat generation amount differs greatly between an upshift and a downshift. More specifically, the heat generation amount when the clutch is in an engagement transition state during an upshift is greater than that of a downshift. When the clutch is in an engagement transition state during a downshift, on the other hand, the heat generation amount is smaller than that of an upshift.

The reason for this is that when a disengagement side clutch is disengaged during a downshift, the engine rotation speed increases under its own power such that an engagement side clutch is engaged at a synchronized timing, and therefore the heat generation amount $T_{up}$ in the engagement side clutch is smaller than the heat generation amount $T_{up}$ thereof during an upshift.

Hence, in this embodiment, when an upshift is determined during an engagement transition state, the heat generation amount $T_{up}$ of the clutch is calculated on the basis of the following Equation (3), and when a downshift is determined, the heat generation amount $T_{up}$ is calculated on the basis of the following Equation (4).

$$T_{up} = (\Delta N \times T_{in} \times \Delta t / 1000) \times A \times \alpha \quad (3)$$

$$T_{up} = 0 \quad (4)$$

In Equation (3), $\Delta N$ is a relative rotation speed of the clutch, $T_{in}$ is a transmission torque of the clutch, $\Delta t$ is a very short shift period, A is a constant for converting an energy amount into a temperature, and $\alpha$ is a matching constant (correction coefficient). The relative rotation speed $\Delta N$ of the clutch is calculated on the basis of the turbine rotation speed NT obtained by the turbine rotation speed sensor 12, the output shaft rotation speed No obtained by the output shaft rotation speed sensor 13, and a gear ratio of the respective gears of the transmission. Further, the transmission torque of the clutch is calculated from the duty values of the solenoid valves provided in relation to the respective clutches, or in other words oil pressure values.

Further, even during an engagement transition, the heat generation amount $T_{up}$ during a downshift is slight, and therefore, in this embodiment, the heat generation amount $T_{UP}$ during a downshift is set at 0, as shown in Equation (4). The reason for this is that when the clutch enters an engagement transition state, the temperature reduction (heat radiation) generated by the lubricating oil and the comparatively small temperature increase generated by heat generation cancel each other out, as noted above, and therefore the temperature remains substantially constant.

Hence, during an upshift, the current clutch temperature Tc is calculated by calculating the heat generation amount $T_{UP}$ periodically while the shift is underway, and adding the clutch temperature Tc calculated in the previous control period to the calculated heat generation amount $T_{UP}$. As described above, the initial value of the clutch temperature Tc is set at the ATF temperature $T_{OIL}$ obtained by the oil temperature sensor 14.

When the clutch is determined to be in a disengagement transition state, on the other hand (for example, the second brake 23 during a 2→3 shift), the disengagement transition heat generation amount calculating means 108 provided in the heat generation amount calculating means 105 calculates the heat generation amount $T_{up}$ of the clutch.

On the basis of information from the shift map 3, the disengagement transition heat generation amount calculating means 108 determines whether the current shift is an upshift or a downshift. When the clutch is in a disengagement transition state, the heat generation amount differs greatly between an upshift and a downshift. In contrast to an engagement transition, the heat generation amount during a downshift engagement transition is greater than that of an upshift. When the clutch is in a disengagement transition state during an upshift, on the other hand, the heat generation amount is smaller than that of a downshift.

Hence, when an upshift is determined, the heat generation amount $T_{up}$ is calculated on the basis of the above Equation (4), and when a downshift is determined, the heat generation amount $T_{up}$ is calculated on the basis of the Equation (3).

When a shift is determined by the controller 1 while calculating the current clutch temperature Tc in the manner described above, the temperature increase $T_{INH}$ of the clutch that contributes to the shift upon execution of the next shift from the current temperature state is predicted.

The temperature increase $T_{INH}$ is predicted by the predicted temperature increase calculating means 102 provided in the controller 1. Here, as shown in FIG. 5, the predicted temperature increase calculating means 102 comprises UP shift predicted temperature increase calculating means 111 for predicting the temperature increase $T_{INH}$ of the clutch during an upshift, normal DOWN shift predicted temperature increase calculating means 112 for predicting the temperature increase $T_{INH}$ of the clutch during a normal downshift, PYDOWN shift predicted temperature increase calculating means 113 for predicting the temperature increase $T_{INH}$ of the clutch during a PYDOWN shift to be described below, and second synchronized shift predicted temperature increase calculating means 114 for predicting the temperature increase $T_{INH}$ of the clutch during a second synchronized shift.

When an upshift or a downshift is determined by the controller 1, the temperature increase $T_{INH}$ is predicted before an upshift command or a downshift command is actually issued.

Calculation methods employed by the respective predicted temperature increase calculating means will be described below.

As shown in FIG. 5, when the predicted temperature increase $T_{INH}$ during the next shift is calculated by the predicted temperature increase calculating means 102 in this manner, the predicted temperature increase $T_{INH}$ and the current clutch temperature Tc calculated by the current temperature calculating means 101 are input into the predicted temperature calculating means 103.

The predicted temperature increase $T_{INH}$ is added to the current clutch temperature Tc by the predicted temperature calculating means 103, whereby a predicted temperature $T_{ES}$ upon completion of the next shift is calculated.

Further, as shown in FIG. 5, the controller 1 is provided with threshold storing means 110. The threshold storing means 110 stores an UP burnout temperature and a DOWN burnout temperature. The UP burnout temperature is a temperature at which the clutch burns out when the clutch temperature Tc exceeds, and is used during an upshift (also written as UP shift hereafter) to determine whether or not the post-shift clutch temperature Tc exceeds the UP burnout temperature. The DOWN burnout temperature is a lower temperature than the UP burnout temperature, and is used during a downshift (also written as DOWN shift hereafter) to determine whether or not the post-shift clutch temperature Tc exceeds the DOWN shift temperature, and is obtained by subtracting a temperature increase corresponding to the maximum heat generation amount $T_{up}$ generated by a PYUP shift from the UP burnout temperature. A PYUP shift means a shift such that a determined shift is executed in a shift mode that generates a smaller heat generation amount $T_{up}$ than a normal UP shift, and will be described below.

In the comparing means 109, the predicted temperature $T_{ES}$ is compared to the UP burnout temperature or the DOWN burnout temperature, and when it is determined that the predicted temperature $T_{ES}$ is equal to or greater than the UP burnout temperature or the DOWN burnout temperature, the determined upshift or downshift is either prohibited or switched to another shift by the shift prohibiting/switching means 104. Here, another shift indicates a PYUP shift relating to an upshift performed in a normal shift mode or a PYDOWN shift relating to a downshift performed in the normal shift mode. When the predicted temperature $T_{ES}$ is determined to be lower than the UP burnout temperature or the DOWN burnout temperature, on the other hand, the determined shift is permitted, and either an upshift or a downshift is executed in the normal shift mode.

Further, as shown in FIG. 5, the controller 1 is provided with continuous change-mind shift allowable number calculating means 115. A change-mind indicates that a shift to the $n^{th}$ speed is determined anew during an operation to shift from the $n^{th}$ speed to the $n+1^{th}$ speed or an $n-1^{th}$ speed. When the shift determination is determined to be a change-mind, a number of allowable continuous change-mind shifts is calculated on the basis of the current clutch temperature Tc, without predicting the temperature increase $T_{INH}$ of the clutch.

A current number of continuous change-mind shifts is then compared to the allowable number of continuous change-mind shifts in the comparing means 109. When it is determined that the current number of continuous change-mind shifts is equal to or greater than the allowable number of continuous change-mind shifts, execution of the determined upshift or downshift is prohibited. When it is determined that the current number of continuous change-mind shifts is smaller than the allowable number of continuous change-mind shifts, on the other hand, execution of the determined upshift or downshift is permitted.

By means of the control described above, when there is a danger of burns occurring on a clutch, the next upshift or downshift is prohibited or the shift mode is switched from the normal shift mode to another shift mode, and when it is determined that there is no danger of burns occurring on the clutch, the upshift or downshift is permitted. As a result, shifts can be prohibited or permitted appropriately, in accordance with the thermal load state of the clutch.

The PYUP shift and PYDOWN shift will now be described. The PYUP shift and PYDOWN shift are shift modes in which the input torque is identical to the shift mode of a normal upshift and a normal downshift, but the shift time is shorter, leading to a corresponding decrease in the heat generation amount $T_{up}$. Specifically, the shift time is shortened by increasing the increase gradient and decrease gradient of the oil pressure.

It should be noted that hereafter in this specification, the term "upshift" will be used to signify a switch to a High side gear position. The term "UP shift" indicates an upshift performed in the normal shift mode, and will be used mainly to clarify differences with an upshift performed in another shift mode (for example, a PYUP shift). Similarly, the term "downshift" will be used to signify a switch to a Low side gear position. The term "DOWN shift" indicates a downshift performed in the normal shift mode, and will be used mainly to clarify differences with a downshift performed in another shift mode (for example, a PYDOWN shift).

Figure 9:
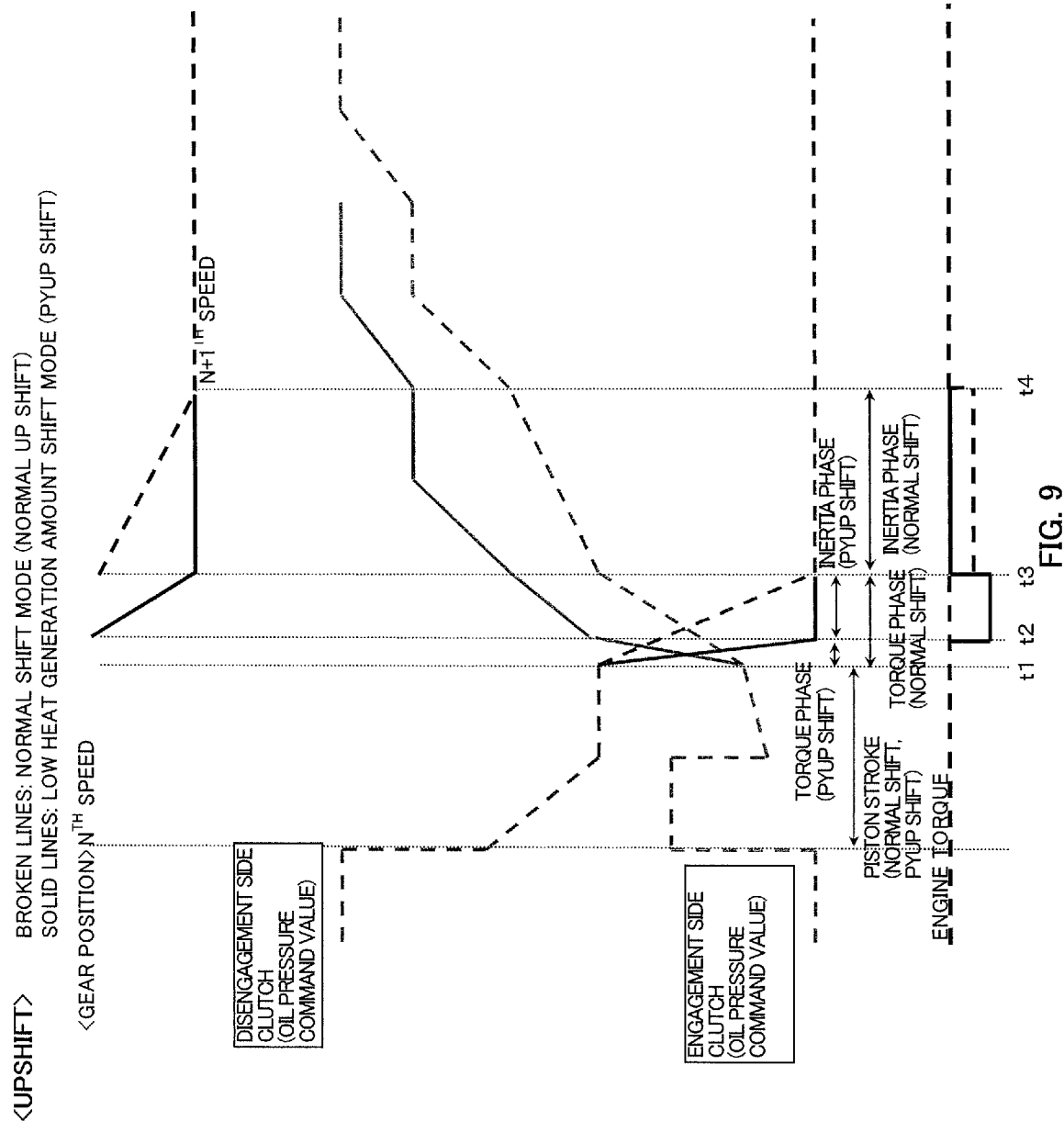
FIG. 9 is a time chart of a PYUP shift.

First, a PYUP shift will be described with reference to FIG. 9. FIG. 9 is a time chart showing a gear ratio, an oil pressure command value of a disengagement side clutch, an oil pressure command value of an engagement side clutch and engine torque variation during a PYUP shift, in which the broken lines indicate the normal shift mode (a normal UP shift) and the solid lines indicate the low heat generation amount shift mode (a PYUP shift).

As shown by the solid lies in FIG. 9, the engagement side clutch is controlled such that the oil pressure increase gradient during the torque phase (t1 to t2) and the oil pressure increase gradient during the inertia phase (t2 to t3) are larger than those of the normal shift mode (a normal UP shift). Further, the disengagement side clutch is controlled to increase the oil pressure decrease gradient during the torque phase (t1 to t2). The reason for this is that if the disengagement side clutch still has capacity when the engagement side clutch begins to take on capacity, interlocking may occur.

Thus, whereas a time period of (t4-t1) is required for the gear ratio to shift from the $n^{th}$ speed to the $n+1^{th}$ speed in the normal shift mode (a normal UP shift), a PYUP shift requires only a time period of (t3-t1), and therefore the shift can be shortened by a time period of (t4-t3). As a result, the heat generation amount $T_{up}$ of the engagement side clutch decreases in accordance with the shortened time period.

Engine torque reduction control is performed during the inertia phase of an upshift, but during a PYUP shift, the torque reduction amount is set to be larger, and therefore, even though the engagement side clutch is engaged in a short time period during a PYUP shift, an increase in shift shock can be suppressed.

Figure 10:
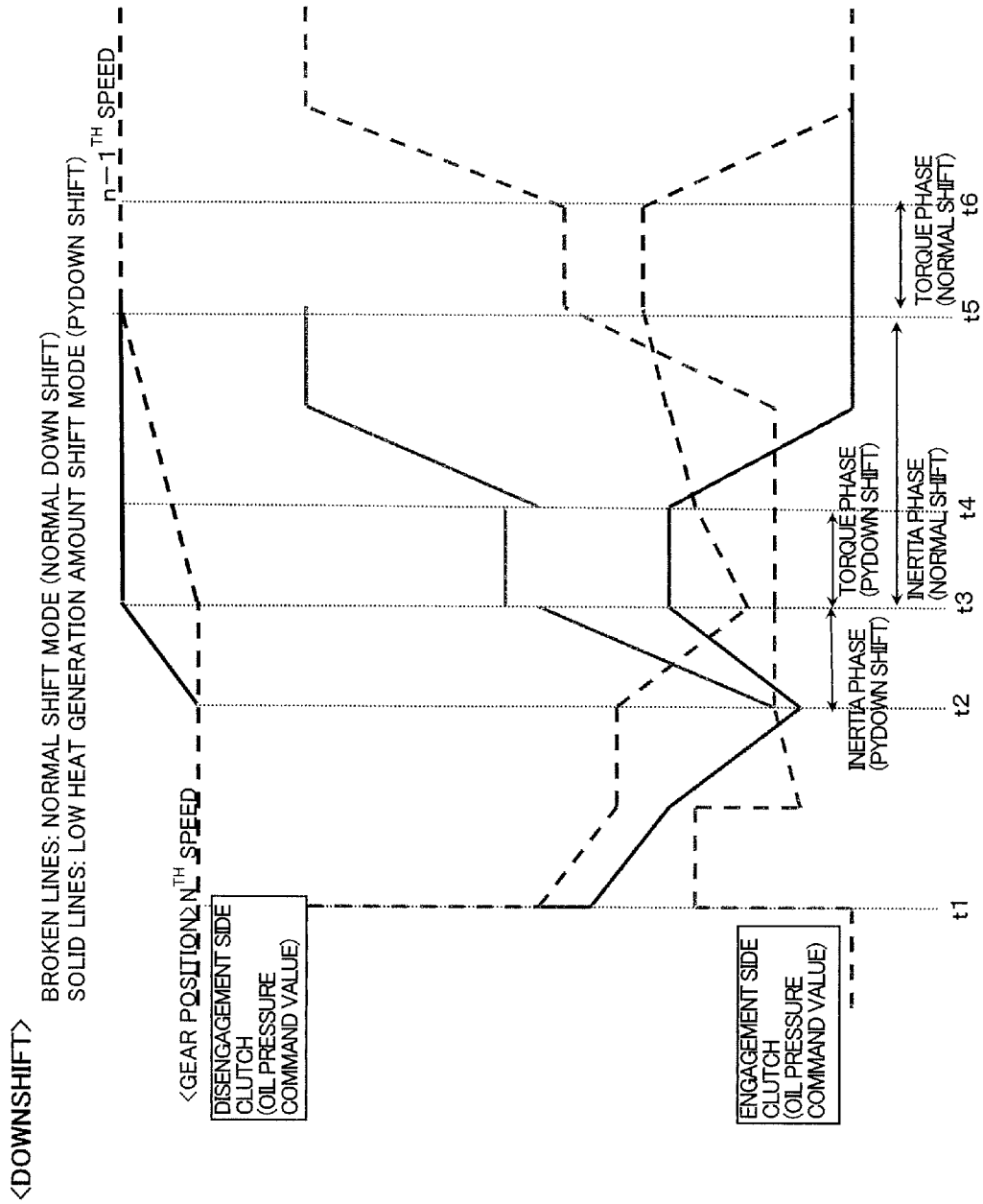
FIG. 10 is a time chart of a PYDOWN shift.

A PYDOWN shift will now be described similarly with reference to FIG. 10. FIG. 10 is a time chart showing the gear ratio and variation in the oil pressure command value of the disengagement side clutch and the oil pressure command value of the engagement side clutch during a PYDOWN shift. In FIG. 10, the broken lines indicate the normal shift mode (a normal DOWN shift) and the solid lines indicate the low heat generation amount shift mode (a PYDOWN shift).

As shown by the solid lies in FIG. 10, the disengagement side clutch is controlled such that the oil pressure decrease gradient from the start of the shift to the start of the inertia phase (t1 to t2) and the oil pressure increase gradient during the inertia phase (t2 to t3) are larger than those of a normal shift. Further, the engagement side clutch is controlled to increase the oil pressure increase gradient during the inertia phase (t2 to t3).

Thus, whereas a time period of (t6-t1) is required for the gear ratio to shift from the $n^{th}$ speed to the $n-1^{th}$ speed during a normal shift, a PYDOWN shift requires only a time period of (t4-t1), and therefore the shift can be shortened by a time period of (t6-t4). As a result, the heat generation amount $T_{up}$ of the disengagement side clutch decreases in accordance with the shortened time period.

The control performed by the controller 1, described above with reference to FIG. 5, will be described in detail below using flowcharts in FIGS. 11 to 18. It should be noted that the flowcharts shown in FIGS. 11 to 18 are executed on each clutch.

Figure 11:
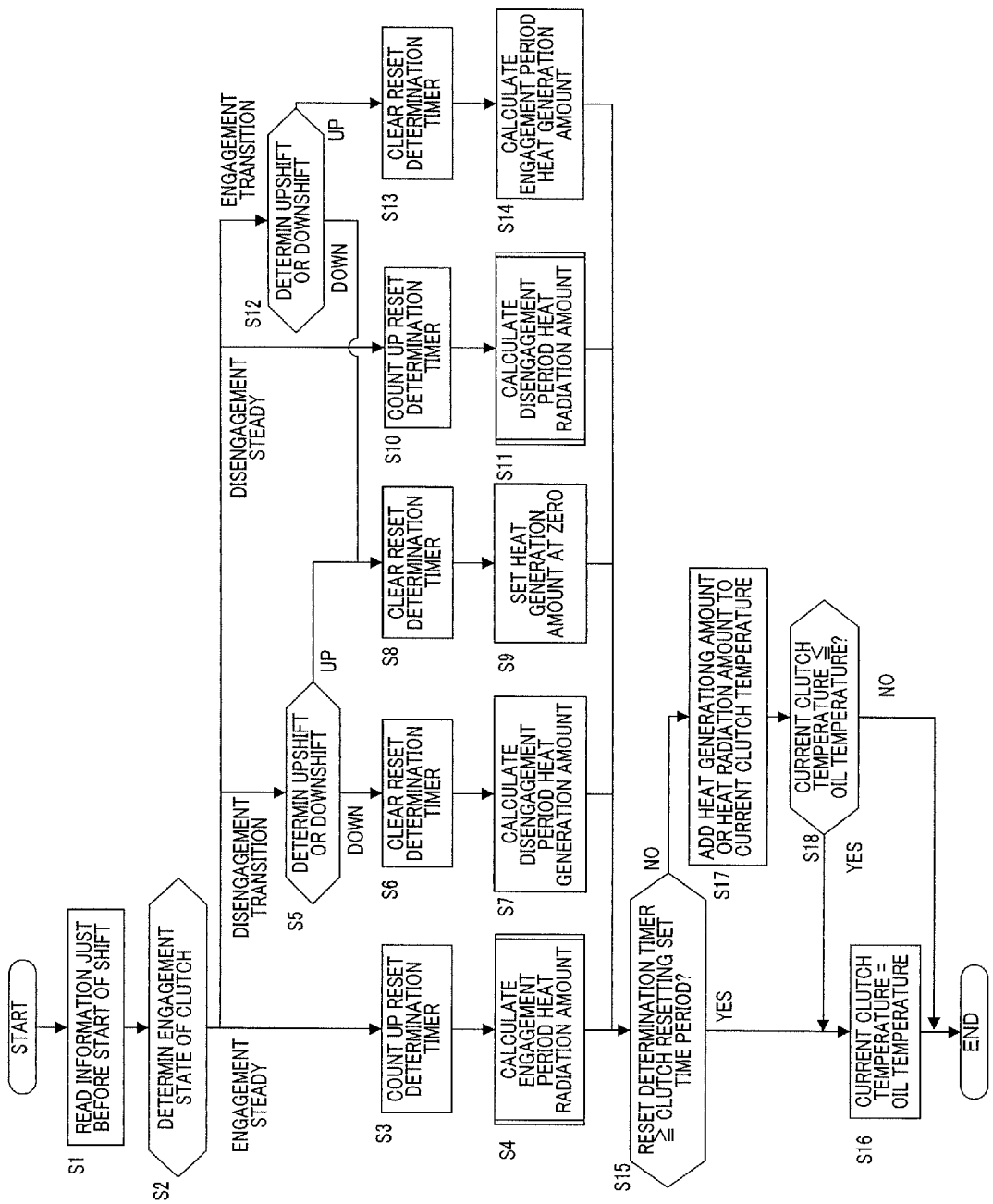
FIG. 11 is a flowchart showing clutch temperature calculation control in the shift control device for an automatic transmission according to this embodiment.

First, referring to FIG. 11, the control content of the current temperature calculating means 101 will be described.

In a step S1, information such as the current engine rotation speed NE, turbine rotation speed NT, oil temperature $T_{OIL}$, and vehicle speed No is obtained.

In a step S2, a determination is made as to whether the clutch is in the engagement steady state, the disengagement transition state, the disengagement steady state, or the engagement transition state.

When the clutch is in the engagement steady state, the routine advances to a step S3, where the reset determination timer is counted up. The routine then advances to a step S4, where an engagement period heat radiation amount $T_{down}$ is calculated. Calculation of the engagement period heat radiation amount $T_{down}$ will be described below.

When the clutch is in the disengagement transition state, the routine advances to a step S5, where a determination is made as to whether the shift type is an upshift or a downshift. When the shift type is a downshift, the routine advances to a step S6, where the reset determination timer is cleared. The routine then advances to a step S7, where a disengagement period heat generation amount $T_{up}$ is calculated. The disengagement period heat generation amount $T_{up}$ is calculated on the basis of Equation (3). When the shift type is an upshift, the routine advances to a step S8, where the reset determination timer is cleared. The routine then advances to a step S9, where the heat generation amount $T_{up}$ is set at 0 on the basis of Equation (4).

When the clutch is in the disengagement steady state, the routine advances to a step S10, where the reset determination timer is counted up. The routine then advances to a step S11, where a disengagement period heat radiation amount $T_{down}$ is calculated. Calculation of the disengagement period heat radiation amount $T_{down}$ will be described below.

When the clutch is in the engagement transition state, the routine advances to a step S12, where a determination is made as to whether the shift type is an upshift or a downshift. When the shift type is a downshift, the routine advances to the step S8, where the reset determination timer is cleared. The routine then advances to the step S9, where the heat generation amount $T_{up}$ is set at 0 on the basis of Equation (4). When the shift type is an upshift, the routine advances to a step S13, where the reset determination timer is cleared. The routine then advances to a step S14, where the engagement period heat generation amount $T_{up}$ is calculated on the basis of Equation (3).

In a step S15, a determination is made as to whether or not the reset determination timer is equal to or greater than a clutch resetting set time period. When the reset determination timer is equal to or greater than the clutch resetting set time period, the routine advances to a step S16, where the current clutch temperature Tc is set at the oil temperature $T_{OIL}$. The processing is then terminated.

When the reset determination timer is smaller than the clutch resetting set time period, the routine advances to a step S17, where either the heat generation amount $T_{up}$ or the heat radiation amount $T_{down}$ is added to the current clutch temperature Tc. It should be noted that the heat radiation amount $T_{down}$ is a negative value. Here, the clutch resetting set time period is a time period long enough to determine that the clutch temperature Tc has decreased sufficiently to be equal to the oil temperature $T_{OIL}$ after the clutch has remained in the engagement steady state or disengagement steady state continuously for a predetermined time period.

In a step S18, a determination is made as to whether or not the current clutch temperature Tc is equal to or lower than the oil temperature $T_{OIL}$. When the current clutch temperature Tc is equal to or lower than the oil temperature $T_{OIL}$, the routine advances to the step S16, where the current clutch temperature Tc is set at the oil temperature $T_{OIL}$. When the current clutch temperature Tc is higher than the oil temperature $T_{OIL}$, the processing is terminated. In other words, in reality the clutch temperature Tc is unlikely to fall below the oil temperature $T_{OIL}$, and therefore, when the calculated clutch temperature Tc is lower than the oil temperature $T_{OIL}$, the clutch temperature Tc is set at the oil temperature $T_{OIL}$.

Figure 12:
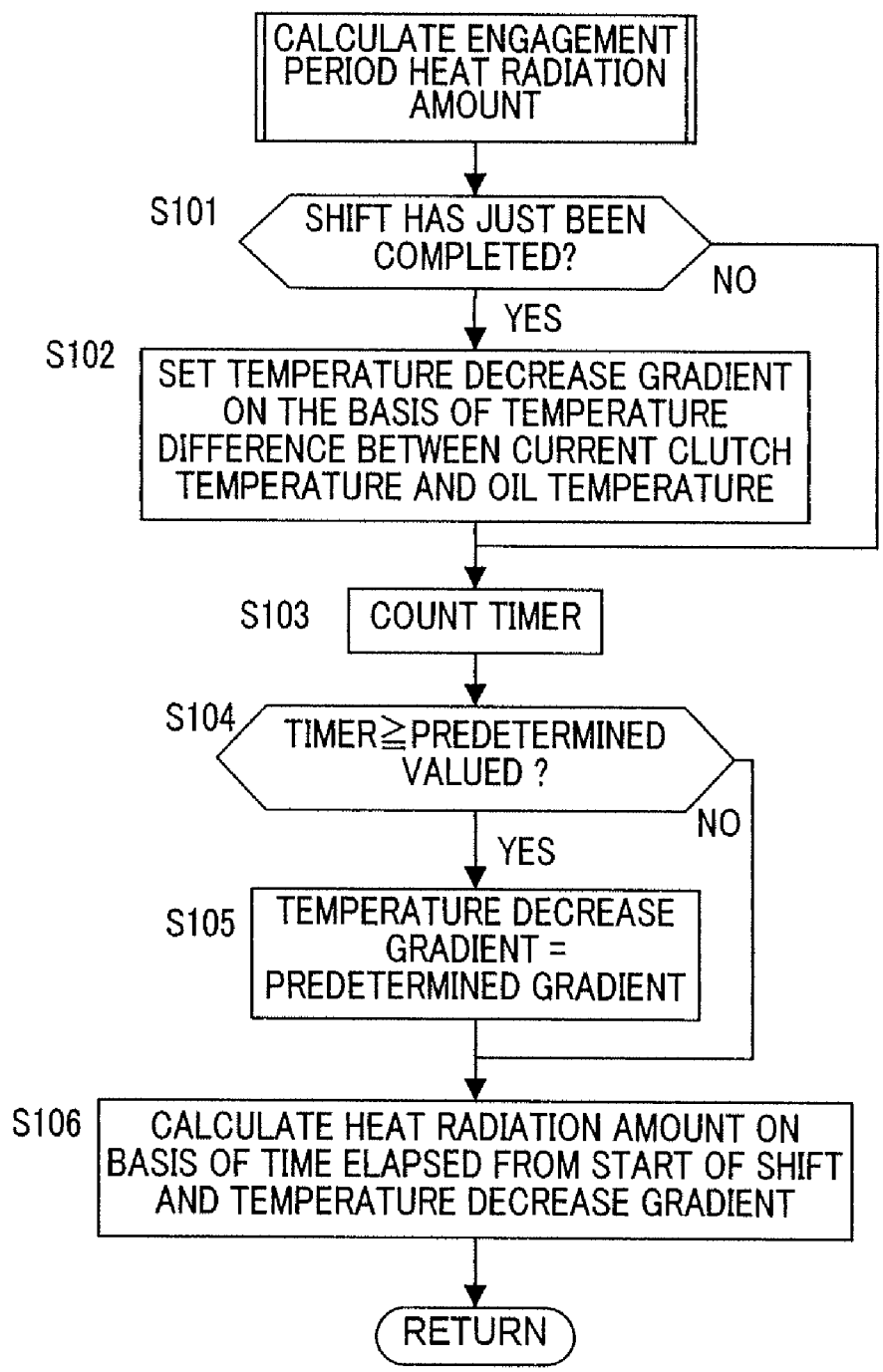
FIG. 12 is a flowchart showing control for calculating a heat radiation amount during engagement.

Calculation of the engagement period heat radiation amount $T_{down}$ in the step S4 of FIG. 11 will now be described with reference to the flowchart of FIG. 12. It should be noted that the disengagement period heat radiation amount $T_{down}$ of the step S11 is calculated using a similar method to calculation of the engagement period heat radiation amount $T_{down}$ to be described below.

In a step S101, a determination is made as to whether or not a shift has just been completed. When a shift has just been completed, the routine advances to a step S102, and when a shift has not just been completed, the routine advances to a step S103.

In the step S102, the temperature decrease gradient is set on the basis of the temperature difference between the current clutch temperature Tc and the oil temperature $T_{OIL}$. The temperature decrease gradient corresponds to A and C in Equations (1) and (2), and is set to increase as the temperature difference between the current clutch temperature Tc and the oil temperature $T_{OIL}$ increases.

In the step S103, the timer is counted.

In a step S104, a determination is made as to whether or not the timer is at or above a predetermined value. When the timer is at or above the predetermined value, the routine advances to a step S105, where the temperature decrease gradient is set at a predetermined gradient (a fixed value).

In a step S106, the current engagement period heat radiation amount $T_{down}$ is calculated from the time elapsed since the start of the shift (the value of the timer) and the temperature decrease gradient, whereupon the processing is terminated. Here, the predetermined value corresponds to t1 in Equations (1) and (2), and indicates the time required for the temperature decrease gradient to become substantially constant, regardless of the temperature at the start of heat radiation. The predetermined value is set at 5 seconds, for example.

Next, referring to FIGS. 13 and 14, the control content of the predicted temperature increase calculating means 102, the predicted temperature calculating means 103, the threshold calculating means 110, the continuous change-mind shift allowable number calculating means 115, the comparing means 109, and the shift prohibiting/switching means 104 will be described.

In a step S21, a determination is made as to whether or not a shift has been determined. When a shift has been determined, the routine advances to a step S22, and when a shift has not been determined, the processing is terminated.

In the step S22, a determination is made as to whether or not the determined shift is a change-mind shift. When the determined shift is a change-mind shift, the routine advances to a step S50, and when the determined shift is not a change-mind shift, the routine advances to a step S23. A change-mind shift indicates that a shift to the $n^{th}$ speed is determined anew during an operation to shift from the $n^{th}$ speed to the $n+1^{th}$ speed or the $n-1^{th}$ speed.

In the step S23, a determination is made as to whether or not the shift is an upshift or a downshift. When the shift is an upshift, the routine advances to a step S24, and when the shift is a downshift, the routine advances to a step S29.

In the step S24, an UP shift predicted temperature increase is calculated. The UP shift predicted temperature increase is the predicted temperature increase $T_{INH}$ of the clutch to be engaged during the upshift, and a calculation method thereof will be described in detail below.

In a step S25, an UP shift predicted temperature $T_{ES}$ is determined by adding the UP shift predicted temperature increase to the current clutch temperature Tc.

In a step S26, a determination is made as to whether or not the UP shift predicted temperature $T_{ES}$ is equal to or greater than the UP burnout temperature, or in other words whether or not the UP shift predicted temperature $T_{ES}$ is within a temperature region at or above the UP burnout temperature. When the UP shift predicted temperature $T_{ES}$ is lower than the UP burnout temperature, the routine advances to a step S27, where an UP shift is performed in the normal shift mode. When the UP shift predicted temperature $T_{ES}$ is equal to or greater than the UP burnout temperature, the routine advances to a step S28, where a PYUP shift is performed in the low heat generation amount shift mode. Here, a normal UP shift performed in the normal shift mode is executed by setting the oil pressure such that the driver does not feel shift shock. In a PYUP shift, the increase rate of the oil pressure supplied to the clutch is increased beyond that of a normal UP shift to shorten the time required to engage the clutch. It should be noted that during a PYUP shift, the torque reduction amount of the engine is increased beyond that of a normal UP shift. In so doing, an increase in shift shock can be suppressed, and since the input torque decreases, the heat generation amount $T_{up}$ also decreases.

When the shift is determined to be a downshift in the step S23, on the other hand, the routine advances to a step S29, where the DOWN burnout temperature is calculated. A calculation method for calculating the DOWN burnout temperature will be described in detail below.

In the step S30, a determination is made as to whether or not the downshift has been caused by depressing the accelerator. If so, the routine advances to a step S40, and if not, the routine advances to a step S31.

In the step S31, a normal DOWN shift predicted temperature increase is calculated. The normal DOWN shift predicted temperature increase is the predicted temperature increase $T_{INH}$ of the clutch that is disengaged during a normal downshift, and a calculation method thereof will be described in detail below.

In a step S32, a normal DOWN shift predicted temperature $T_{ES}$ is determined by adding the normal DOWN shift predicted temperature increase to the current clutch temperature Tc.

In a step S33, a determination is made as to whether or not the normal DOWN shift predicted temperature $T_{ES}$ is equal to or greater than the DOWN burnout temperature, or in other words whether or not the normal DOWN shift predicted temperature $T_{ES}$ is within a temperature region at or above the DOWN burnout temperature. When the normal DOWN shift predicted temperature $T_{ES}$ is lower than the DOWN burnout temperature, the routine advances to a step S34, where a normal DOWN shift is performed. When the normal DOWN shift predicted temperature $T_{ES}$ is equal to or greater than the DOWN burnout temperature, the routine advances to a step S35.

In the step S35, a PYDOWN shift predicted temperature increase is calculated. The PYDOWN shift predicted temperature increase is the predicted temperature increase $T_{INH}$ of the clutch that is disengaged during a PYDOWN shift, and a calculation method thereof will be described in detail below. A PYDOWN shift is a shift in which the time required to disengage the clutch is shortened by increasing the decrease rate of the oil pressure supplied to the clutch beyond that of a normal DOWN shift performed in the normal shift mode.

In a step S36, a PYDOWN shift predicted temperature $T_{ES}$ is determined by adding the PYDOWN shift predicted temperature increase $T_{INH}$ to the current clutch temperature Tc.

In a step S37, a determination is made as to whether or not the PYDOWN shift predicted temperature $T_{ES}$ is equal to or greater than the DOWN burnout temperature, or in other words whether or not the PYDOWN shift predicted temperature $T_{ES}$ is within a temperature region at or above the DOWN burnout temperature. When the PYDOWN shift predicted temperature $T_{ES}$ is lower than the DOWN burnout temperature, the routine advances to a step S38, where a PYDOWN shift is performed. When the PYDOWN shift predicted temperature $T_{ES}$ is equal to or greater than the DOWN burnout temperature, the routine advances to a step S39, where execution of the determined downshift is prohibited.

When the downshift is determined to be caused by depressing the accelerator in the step S30, on the other hand, the routine advances to a step S40, where a determination is made as to whether or not an accelerator opening prior to determining a shift in the step S21 is equal to or smaller than a predetermined opening and whether or not the variation speed of the accelerator opening is equal to or higher than a predetermined speed. When these conditions are satisfied, the routine advances to a step S46, and when either one of these conditions is not satisfied, the routine advances to a step S41. The predetermined opening is set at substantially zero, and the predetermined speed is set at a sufficient value for determining rapid depression of an accelerator pedal. In other words, these conditions are established when rapid depression is performed from a state in which the accelerator opening is substantially fully closed. This case corresponds to a case in which first synchronization control is performed, and therefore the routine advances to the step S46. A case in which the above conditions are not established corresponds to a case in which second synchronization control is performed, and therefore the routine advances to the step S41.

The first synchronization control and second synchronization control are control to engage the clutch to be engaged after synchronizing the engine rotation speed and the rotation speed of the clutch during a downshift. In the first synchronization control, the disengagement side clutch is disengaged rapidly without dragging the clutch, or in other words, the oil pressure supplied to the clutch is reduced stepwise. In the second synchronization control, the clutch is disengaged while being dragged, or in other words the oil pressure supplied to the clutch is reduced gradually, with the aim of eliminating a sense of output torque loss.

In the step S41, a second synchronized shift predicted temperature increase $T_{INH}$ is calculated. The second synchronized shift predicted temperature increase is the predicted temperature increase $T_{INH}$ of the clutch that is disengaged during a shift performed in accordance with the second synchronization control, and a calculation method thereof will be described in detail below.

In a step S42, a second synchronized shift predicted temperature $T_{ES}$ is determined by adding the second synchronized shift predicted temperature increase $T_{INH}$ to the current clutch temperature Tc.

In a step S43, a determination is made as to whether or not the second synchronized shift predicted temperature $T_{ES}$ is equal to or greater than the DOWN burnout temperature. When the second synchronized shift predicted temperature $T_{ES}$ is lower than the DOWN burnout temperature, the routine advances to a step S44, where a shift corresponding to the second synchronization control is performed. When the second synchronized shift predicted temperature $T_{ES}$ is equal to or greater than the DOWN burnout temperature, the routine advances to a step S45, where execution of the determined downshift is prohibited.

When it is determined in the step S40 that the accelerator opening prior to determination of a shift command is equal to or smaller than the predetermined opening and the variation speed of the accelerator opening is equal to or greater than the predetermined speed, on the other hand, the routine advances to the step S46, where the current clutch temperature Tc is read.

In a step S47, a determination is made as to whether or not the current clutch temperature Tc is equal to or greater than the DOWN burnout temperature. If the current clutch temperature Tc is lower than the DOWN burnout temperature, the routine advances to a step S48, where a shift corresponding to the first synchronization control is performed, and when the current clutch temperature Tc is equal to or greater than the DOWN burnout temperature, the routine advances to a step S49, where the downshift is prohibited.

Figure 14:
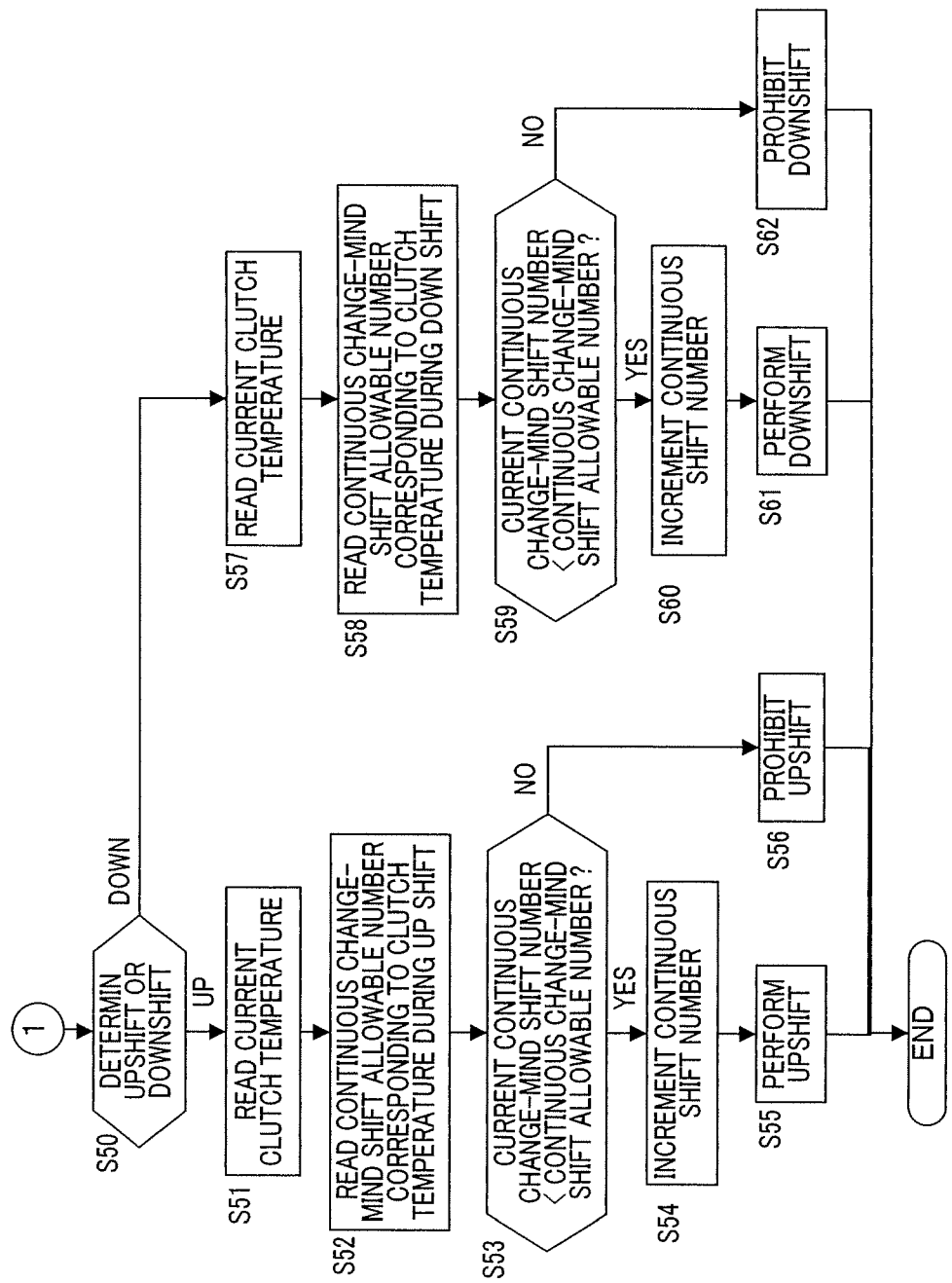
FIG. 14 is a flowchart showing shift control in the shift control device for an automatic transmission according to this embodiment.

When it is determined in the step S22 that the determined shift is a change-mind shift, the routine advances to the step S50 in FIG. 14, where a determination is made as to whether the shift is an upshift or a downshift. When an upshift is determined, the routine advances to a step S51, and when a downshift is determined, the routine advances to a step S57. In the step S50, similarly to the step S23, an upshift only signifies an engagement transition state upshift and a downshift only signifies a disengagement transition state downshift.

In the step S51, the current clutch temperature Tc is read.

In a step S52, the continuous change-mind shift allowable number corresponding to the clutch temperature Tc during an UP shift is read. The continuous change-mind shift allowable number is determined on the basis of the clutch temperature Tc by referring to a map shown in FIG. 15.

Figure 15:
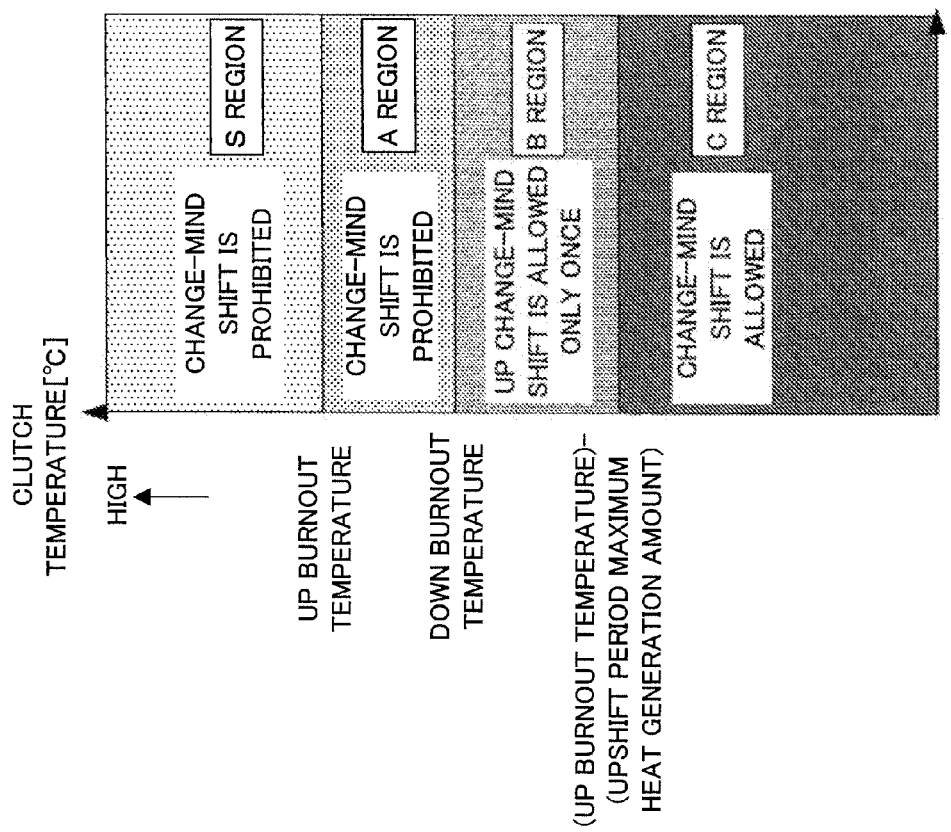
FIG. 15 is a map showing an allowable number of continuous change-mind shifts.

The map shown in FIG. 15 is divided into four regions corresponding to the clutch temperature Tc, namely an S region, an A region, a B region, and a C region. The change-mind shift allowable number is determined according to the region in which the current clutch temperature Tc is located.

In the S region, the clutch temperature Tc is equal to or higher than the UP burnout temperature. In the A region, the clutch temperature Tc is lower than the UP burnout temperature and equal to or higher than the DOWN burnout temperature. In the B region, the clutch temperature Tc is lower than the DOWN burnout temperature and equal to or higher than a temperature obtained by subtracting an upshift period maximum heat generation amount $T_{up}$ from the UP burnout temperature. In the C region, the clutch temperature Tc is lower than the temperature obtained by subtracting the upshift period maximum heat generation amount $T_{up}$ from the UP burnout temperature.

When the current clutch temperature Tc is in the S region, clutch burn occurs, and therefore a change-mind shift is prohibited and the continuous change-mind shift allowable number is set at zero. When the current clutch temperature Tc is in the A region, a single change-mind shift may cause the clutch temperature Tc to enter the S region, and therefore a change-mind shift is prohibited and the continuous change-mind shift allowable number is set at zero. When the current clutch temperature Tc is in the B region, an upshift change-mind shift performed during a downshift can restrict a subsequent downshift, and therefore the continuous change-mind shift allowable number is set at one. When the current clutch temperature Tc is in the C region, there is no need to limit the number of change-mind shifts, but here, the continuous change-mind shift allowable number is set at five, for example.

Returning to FIG. 14, in a step S53, a determination is made as to whether or not the current continuous change-mind shift number is smaller than the continuous change-mind shift allowable number. When the current continuous change-mind shift number is smaller than the continuous change-mind shift allowable number, the routine advances to a step S54, where the continuous shift number is incremented. The routine then advances to a step S55, where an upshift is performed. When the current continuous change-mind shift number is equal to or higher than the continuous change-mind shift allowable number, the routine advances to a step S56, where an upshift is prohibited.

When a downshift is determined in the step S50, on the other hand, the routine advances to a step S57, where the current clutch temperature Tc is read.

In a step S58, the continuous change-mind shift allowable number corresponding to the clutch temperature Tc during a downshift is read. The downshift continuous change-mind shift allowable number is determined similarly to the upshift continuous change-mind shift allowable number determined in the step S52, but differs therefrom when the clutch temperature Tc is in the B region. A downshift change-mind shift performed during an upshift may lead subsequently to a forcible upshift to prevent over-revving of the engine, and in consideration of this upshift, a change-mind shift is prohibited.

In a step S59, a determination is made as to whether or not the current continuous change-mind shift number is smaller than the continuous change-mind shift allowable number. When the current continuous change-mind shift number is smaller than the continuous change-mind shift allowable number, the routine advances to a step S60, where the continuous shift number is incremented. The routine then advances to a step S61, where a downshift is performed. When the current continuous change-mind shift number is equal to or higher than the continuous change-mind shift allowable number, the routine advances to a step S62, where a downshift is prohibited.

Figure 16:
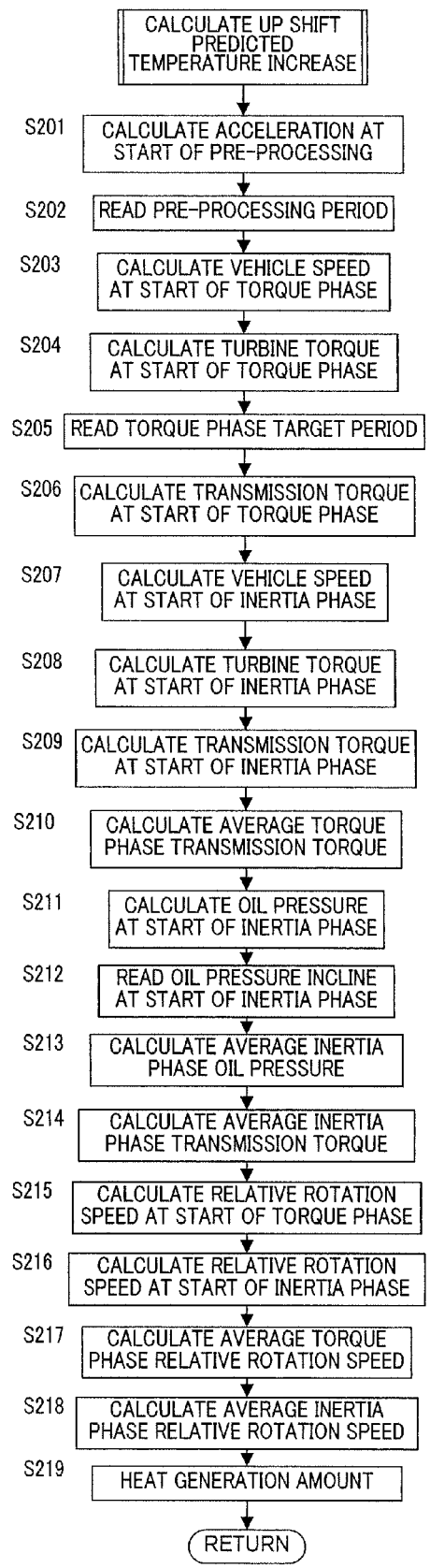
FIG. 16 is a flowchart showing control for calculating a predicted temperature during an UP shift.
Figure 20:
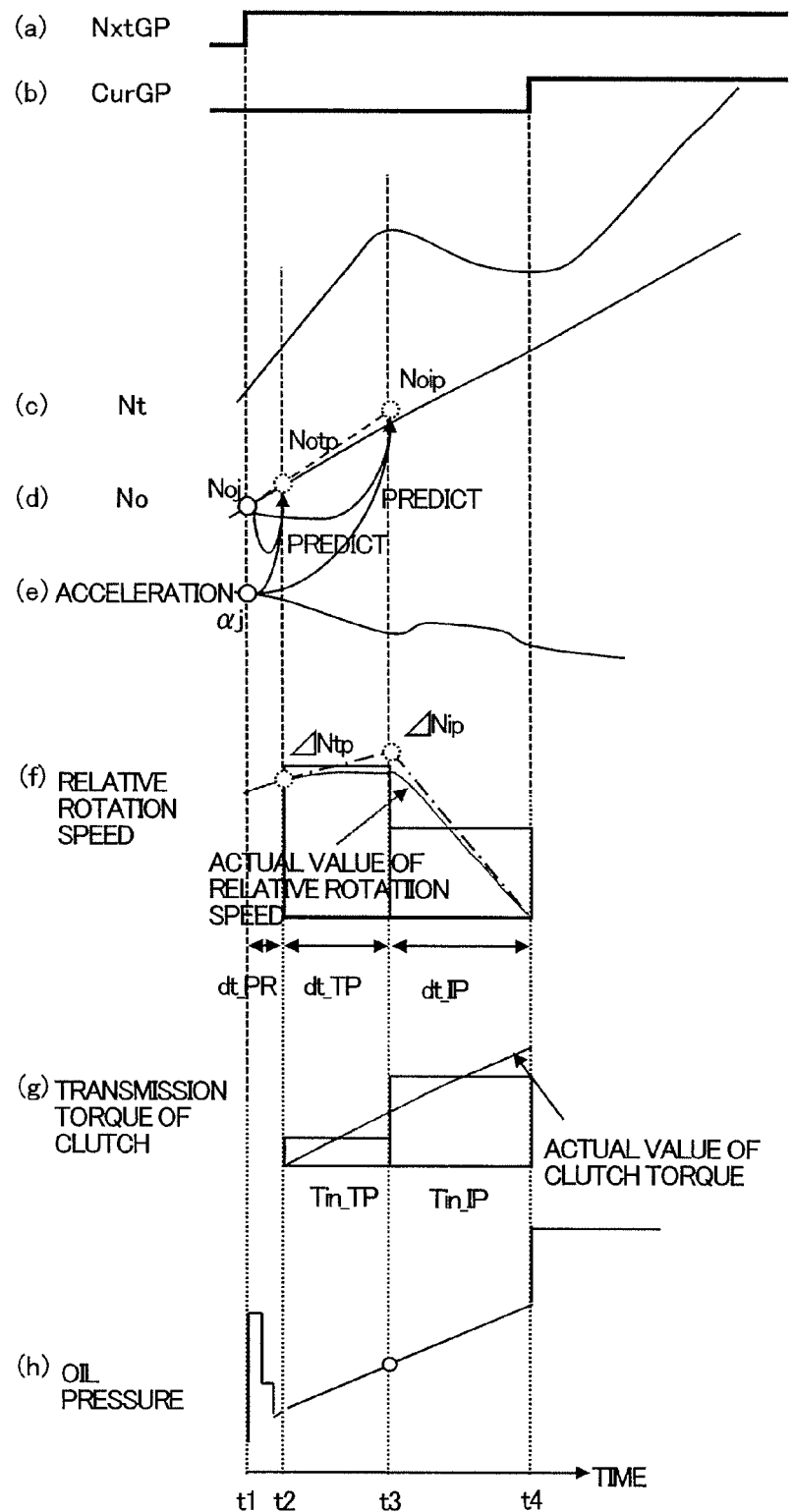
FIG. 20 is a time chart of an UP shift.

Next, calculation of the UP shift predicted temperature increase $T_{INH}$ in the step S24 of FIG. 13 will be described with reference to the flowchart in FIG. 16 and the time chart in FIG. 20. The time chart in FIG. 20 shows (a) a target gear position NxtGP, (b) a current gear position CurGP, (c) the turbine rotation speed NT, (d) the output rotation speed No (vehicle speed), (e) acceleration, (f) the relative rotation speed, (g) the transmission torque of the clutch, and (h) variation in the oil pressure supplied to the clutch. A time period t1-t2 is a pre-processing period, a time period t2-t3 is a torque phase target period, and a time period t3-t4 is an inertia phase target period. Pre-processing corresponds to the time period extending from the shift command to completion of a piston stroke of the clutch.

In a step S201, the acceleration at the start of pre-processing ((e) in FIG. 20; t1) is calculated. The acceleration at the start of pre-processing is calculated on the basis of the vehicle speed at the start of pre-processing and the vehicle speed at a predetermined previous time.

In a step S202, the pre-processing period (t2-t1) is read. The pre-processing period is determined on the basis of the vehicle speed and torque, and in this embodiment, a pre-processing period backup timer provided for shift control is read.

In a step S203, the vehicle speed at the start of the torque phase ((d) in FIG. 20; t2) is calculated. The vehicle speed at the start of the torque phase is calculated by adding a value obtained by multiplying the pre-processing period by the acceleration at the start of pre-processing to the vehicle speed at the start of pre-processing.

In a step S204, turbine torque at the start of the torque phase is calculated. The turbine torque at the start of the torque phase is calculated by referring to a pre-stored rotation-torque conversion map on the basis of the turbine rotation speed NT, which is determined from the vehicle speed at the start of the torque phase and the gear ratio.

In a step S205, the torque phase target period (t3-t2) of the shift control is read on the basis of the vehicle speed at the start of the torque phase and the turbine torque.

In a step S206, transmission torque at the start of the torque phase ((g) in FIG. 20; t2) is calculated. The transmission torque at the start of the torque phase counterbalances a return spring of the clutch, and since no oil pressure is supplied at the start of the torque phase, the transmission torque at the start of the torque phase is zero.

In a step S207, the vehicle speed at the start of the inertia phase ((d) in FIG. 20; t3) is calculated. The vehicle speed at the start of the inertia phase is calculated by adding the vehicle speed at the start of the torque phase to a value obtained by multiplying the torque phase target period by the acceleration at the start of pre-processing.

In a step S208, the turbine torque at the start of the inertia phase is calculated. The turbine torque at the start of the inertia phase is calculated by referring to the rotation-torque conversion map on the basis of the turbine rotation speed NT, which is determined from the vehicle speed at the start of the inertia phase and the gear ratio.

In a step S209, the transmission torque at the start of the inertia phase ((g) in FIG. 20; t3) is calculated. The transmission torque at the start of the inertia phase is calculated by multiplying an apportionment ratio by the turbine torque at the start of the inertia phase. The apportionment ratio is a ratio between the torque received by the plurality of engaged clutches in a certain gear position and the input torque.

In a step S210, an average torque phase transmission torque ((g) in FIG. 20) is calculated. The average torque phase transmission torque is calculated by halving a value obtained by adding the transmission torque at the start of the inertia phase to the transmission torque at the start of the torque phase. In other words, the average torque phase transmission torque is calculated as an average value of the transmission torque at the start of the torque phase and the transmission torque at the start of the inertia phase.

In a step S211, the oil pressure at the start of the inertia phase ((h) in FIG. 20; t2) is calculated. The oil pressure at the start of the inertia phase is calculated in accordance with the following Equation (8).

$$\text{(oil pressure at start of inertia phase)} = \text{(transmission torque at start of inertia phase)}/(A \times \mu \times D \times N) + F/A \qquad (8)$$

Here, A is a surface area, $\mu$ is a frictional coefficient, D is an effective diameter, N is a facing number, and F is the load of the return spring.

In a step S212, an oil pressure incline at the start of the inertia phase is read from the shift control map on the basis of the turbine torque at the start of the inertia phase and the vehicle speed at the start of the inertia phase.

In a step S213, an average inertia phase oil pressure is calculated. The average inertia phase oil pressure is calculated on the basis of the oil pressure at the start of the inertia phase, the oil pressure incline at the start of the inertia phase, and the inertia phase target period. It should be noted that the inertia phase target period is a constant.

In a step S214, an average inertia phase transmission torque ((g) in FIG. 20) is calculated on the basis of the average inertia phase oil pressure.

In a step S215, the relative rotation speed at the start of the torque phase ((f) in FIG. 20; t2) is calculated. The relative rotation speed at the start of the torque phase is calculated in accordance with the following Equation (9).

$$\text{(relative rotation speed at start of torque phase)} = \{A \times \text{(output rotation speed } No \text{ at start of torque phase)} + B \times \text{(turbine rotation speed } NT \text{ at start of torque phase)}\} \times 2\pi/60 \qquad (9)$$

Here, A and B are relative rotation calculation constants determined in advance from a collinear graph.

In a step S216, the relative rotation speed at the start of the inertia phase ((f in FIG. 20; t3) is calculated. The relative rotation speed at the start of the inertia phase is calculated in accordance with the following Equation (10).

$$\text{(relative rotation speed at start of inertia phase)} = \{A \times \text{(output rotation speed } No \text{ at start of inertia phase)} + B \times \text{(turbine rotation speed } NT \text{ at start of inertia phase)}\} \times 2\pi/60 \qquad (10)$$

In a step S217, an average torque phase relative rotation speed ((f) in FIG. 20) is calculated. The average torque phase relative rotation speed is calculated by halving a value obtained by adding the relative rotation speed at the start of the inertia phase to the relative rotation speed at the start of the torque phase. In other words, the average torque phase relative rotation speed is calculated as an average value of the relative rotation speed at the start of the torque phase and the relative rotation speed at the start of the inertia phase.

In a step S218, an average inertia phase relative rotation speed ((f) in FIG. 20) is calculated. The average inertia phase relative rotation speed is calculated by halving the relative rotation speed at the start of the inertia phase. At the end of the inertia phase, the relative rotation speed is zero, and therefore the average inertia phase relative rotation speed is calculated as an average value of the relative rotation speed at the start and end of the inertia phase by halving the relative rotation speed at the start of the inertia phase.

In a step S219, the heat generation amount $T_{up}$ is calculated. The heat generation amount $T_{up}$ is calculated in accordance with the following Equation (11).

$$\begin{aligned}(\text{heat generation amount } T_{up}) = &\{(\text{torque phase period}) \times \\ & (\text{average torque phase relative rotation speed}) \times \\ & (\text{average torque phase transmission torque}) + (\text{in-} \\ & \text{ertia phase period}) \times (\text{average inertia phase} \\ & \text{relative rotation speed}) \times (\text{average inertia phase} \\ & \text{transmission torque})\}/1000 \times (Q\text{-}T \text{ conversion} \\ & \text{coefficient})\end{aligned} \quad (11)$$

Here, the Q-T conversion coefficient is a coefficient for converting [J], which is the unit obtained through the multiplication of time, the relative rotation speed, and torque, into [° C.]. During unit conversion, the coefficient is applied after conversion to [kJ], and is therefore divided by 1000 in advance.

Figure 17:
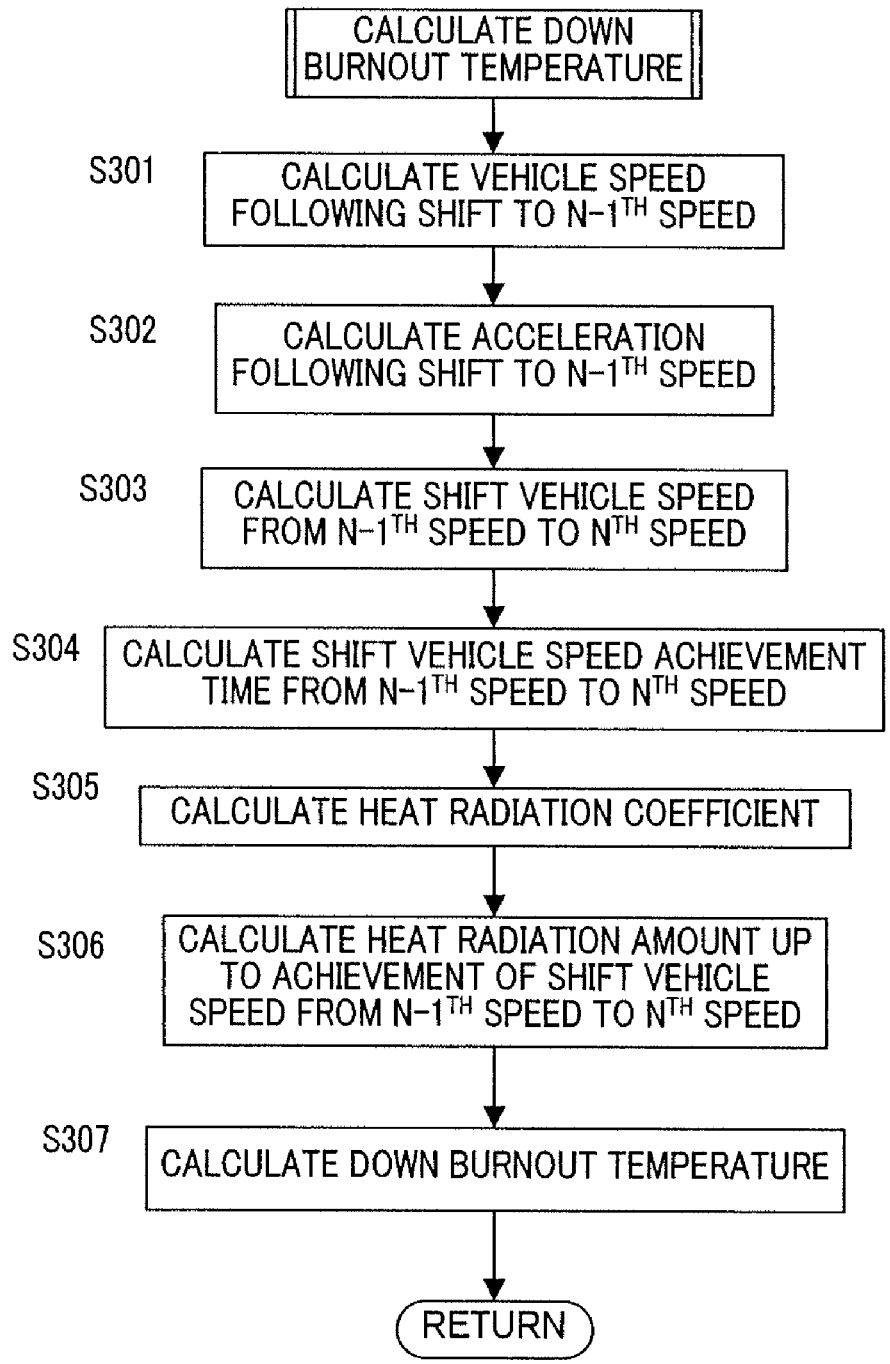
FIG. 17 is a flowchart showing control for calculating a DOWN burnout temperature.

Next, calculation of the DOWN burnout temperature in the step S29 of FIG. 13 will be described with reference to the flowchart in FIG. 17.

In a step S301, the vehicle speed following a shift to the n–1$^{th}$ speed is calculated.

In a step S302, the acceleration following a shift to the n–1$^{th}$ speed is calculated. The acceleration is calculated on the basis of the turbine torque, which is determined by referring to the rotation-torque conversion map, after determining the turbine rotation speed NT from the vehicle speed determined in the step S301.

In a step S303, the shift vehicle speed from the n–1$^{th}$ speed to the n$^{th}$ speed is calculated. The shift vehicle speed from the n–1$^{th}$ speed to the n$^{th}$ speed is the vehicle speed when an UP shift to the n$^{th}$ speed is determined, and is calculated by referring to the shift map.

In a step S304, a shift vehicle speed achievement time from the n–1$^{th}$ speed to the n$^{th}$ speed is calculated. The shift vehicle speed achievement time from the n–1$^{th}$ speed to the n$^{th}$ speed is calculated on the basis of the acceleration calculated in the step S302.

In a step S305, a heat radiation coefficient is calculated. The heat radiation coefficient is calculated on the basis of the heat generation amount $T_{up}$ generated by a downshift and the current clutch temperature Tc, and is set to increase as the temperature following completion of a downshift rises.

In a step S306, the heat radiation amount $T_{down}$ up to achievement of the shift vehicle speed from the n–1$^{th}$ speed to the n$^{th}$ speed is calculated. The heat radiation amount $T_{down}$ is calculated by multiplying the shift vehicle speed achievement time from the n–1$^{th}$ speed to the n$^{th}$ speed by the heat radiation coefficient.

In a step S307, a DOWN burnout temperature is calculated. The DOWN burnout temperature is calculated as the lower value of the UP burnout temperature and a value obtained by adding a temperature reduction resulting from the heat radiation amount $T_{down}$ up to achievement of the shift vehicle speed from the n–1$^{th}$ speed to the n$^{th}$ speed to a base DOWN burnout temperature.

Figure 18:
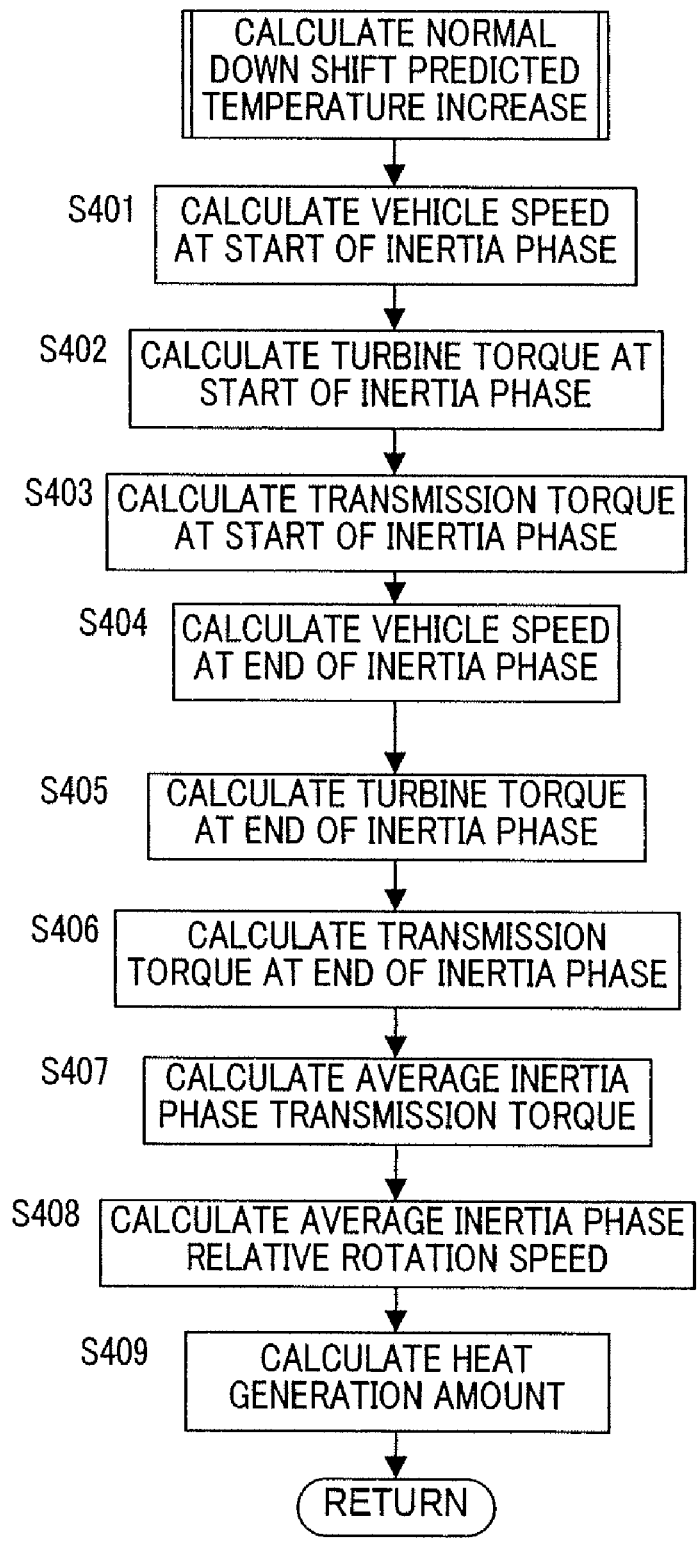
FIG. 18 is a flowchart showing control for calculating a predicted temperature during a normal DOWN shift.
Figure 21:
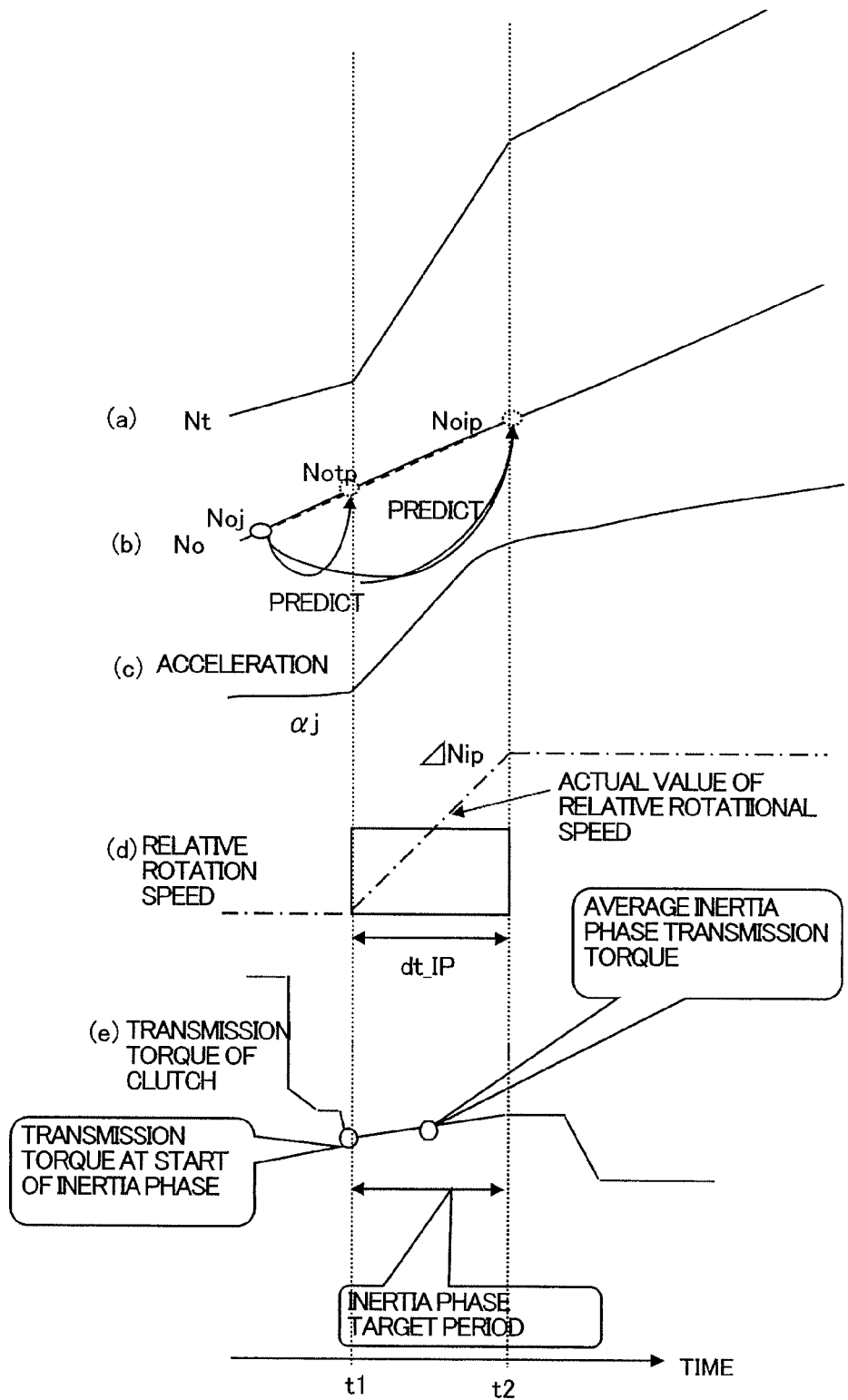
FIG. 21 is a time chart of a DOWN shift.

Here, calculation of the normal DOWN shift predicted temperature increase $T_{INH}$ in the step S31 of FIG. 13 will be described with reference to the flowchart in FIG. 18 and the time chart in FIG. 21. The time chart in FIG. 21 shows (a) the turbine rotation speed NT, (b) the output rotation speed No (vehicle speed), (c) acceleration, (d) the relative rotation speed, and (e) variation in the transmission torque of the clutch. The time period t1 to t2 is the inertia phase target period.

In a step S401, the vehicle speed at the start of the inertia phase ((b) in FIG. 21; t1) is calculated. The vehicle speed at the start of the inertia phase is calculated by adding the vehicle speed at the start of pre-processing to a value obtained by multiplying the pre-processing period by the acceleration at the start of pre-processing.

In a step S402, the turbine torque at the start of the inertia phase is calculated by referring to the rotation-torque conversion map on the basis of the turbine rotation speed NT, which is determined from the vehicle speed at the start of the inertia phase and the gear ratio.

In a step S403, the transmission torque at the start of the inertia phase ((e) in FIG. 21; t1) is calculated. The transmission torque at the start of the inertia phase is calculated by multiplying the apportionment ratio by the turbine torque at the start of the inertia phase.

In a step S404, the vehicle speed at the end of the inertia phase ((b) in FIG. 21; t2) is calculated. The vehicle speed at the end of the inertia phase is calculated on the basis of the current acceleration, the pre-processing period, and the inertia phase target period.

In a step S405, the turbine torque at the end of the inertia phase is calculated. The turbine torque at the end of the inertia phase is calculated by referring to the rotation-torque conversion map on the basis of the turbine rotation speed NT, which is determined from the vehicle speed at the end of the inertia phase and the gear ratio.

In a step S406, the transmission torque at the end of the inertia phase ((e) in FIG. 21; t2) is calculated. The transmission torque at the end of the inertia phase is calculated by multiplying the apportionment ratio and a safety factor by the turbine torque at the end of the inertia phase. The safety factor is a constant for determining the oil pressure upon disengagement of the clutch during a downshift, and is determined on the basis of the turbine torque at the end of the inertia phase and the vehicle speed.

In a step S407, the average inertia phase transmission torque ((e) in FIG. 21) is calculated. The average inertia phase transmission torque is calculated by halving a value obtained by adding the transmission torque at the end of the inertia phase to the transmission torque at the start of the inertia phase. In other words, the average inertia phase transmission torque is calculated as an average value of the transmission torque at the start of the inertia phase and the transmission torque at the end of the inertia phase.

In a step S408, an average inertia phase relative rotation speed ((d) in FIG. 21) is calculated. The average inertia phase relative rotation speed is calculated in accordance with the following Equation (12).

$$\begin{aligned}(\text{average inertia phase relative rotation speed}) = &\{A \times \\ & (\text{output rotation speed } No \text{ at start of inertia} \\ & \text{phase}) + B \times (\text{turbine rotation speed } NT \text{ at start of} \\ & \text{inertia phase})\} \times \pi/60\end{aligned} \quad (12)$$

Here, A and B are relative rotation calculation constants determined in advance from a collinear graph.

In a step S409, the heat generation amount $T_{up}$ is calculated. The heat generation amount $T_{up}$ is calculated in accordance with the following Equation (13).

$$\begin{aligned}(\text{heat generation amount } T_{up}) = &\{(\text{inertia phase period}) \times \\ & (\text{average inertia phase relative rotation speed}) \times \\ & (\text{average inertia phase transmission torque})\}/ \\ & 1000 \times (Q\text{-}T \text{ conversion coefficient})\end{aligned} \quad (13)$$

Figure 13:
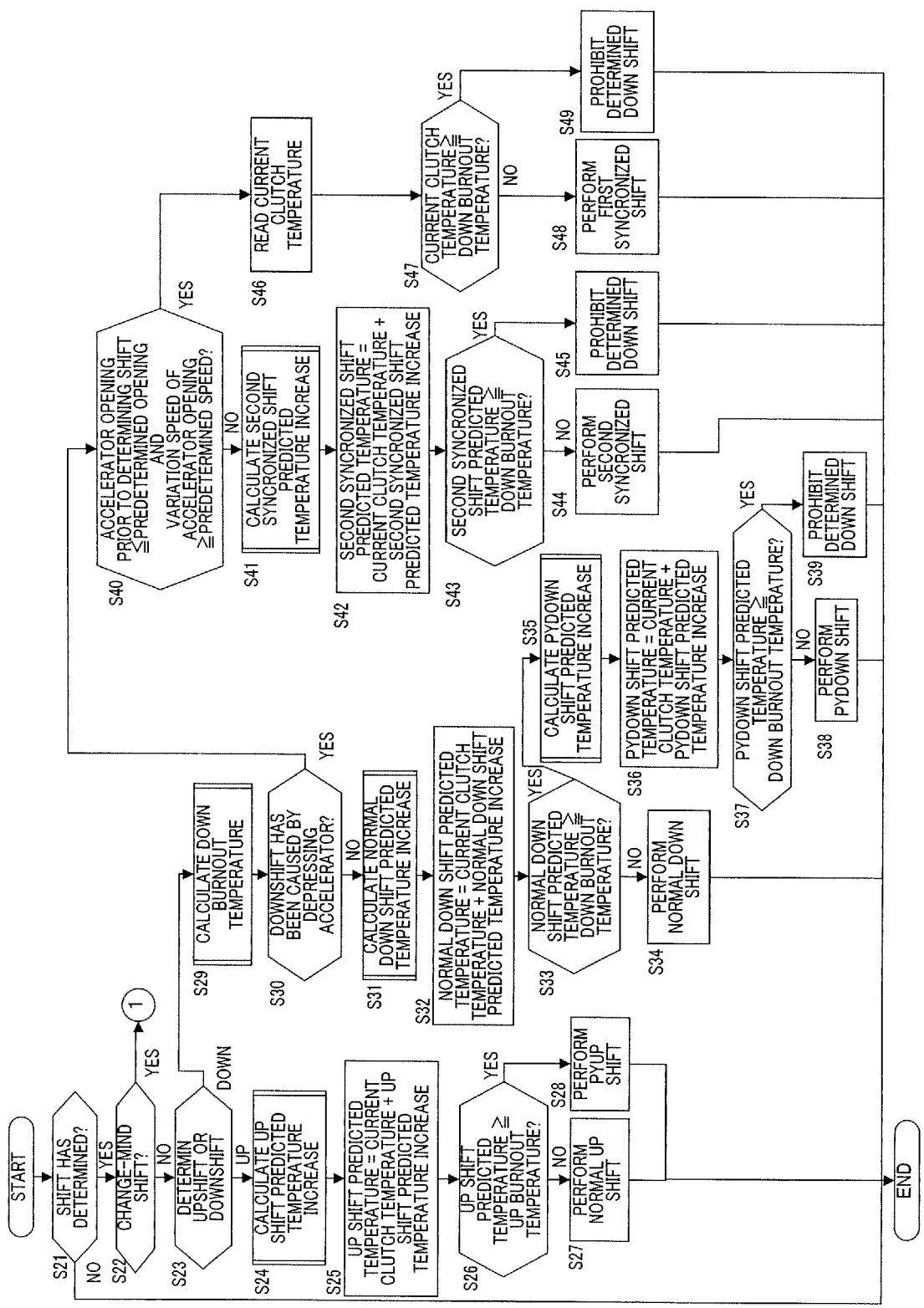
FIG. 13 is a flowchart showing shift control in the shift control device for an automatic transmission according to this embodiment.

Calculation of the PYDOWN shift predicted temperature increase $T_{INH}$ in the step S35 of FIG. 13 is similar to calculation of the normal DOWN shift predicted temperature increase $T_{INH}$ described above, but differs therefrom in that the inertia phase target period used in the step S404 is shorter than that of the normal DOWN shift.

Figure 19:
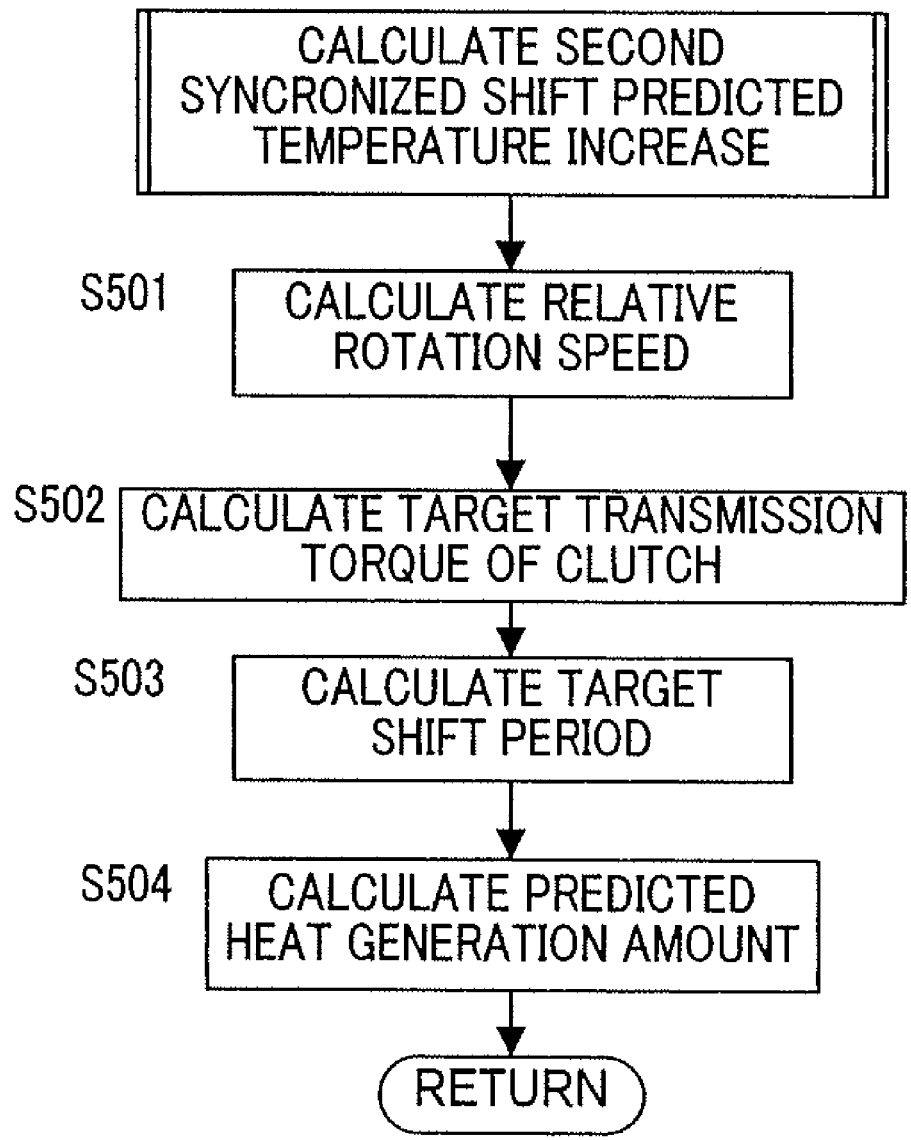
FIG. 19 is a flowchart showing control for calculating a predicted temperature during a second synchronized shift.

Next, calculation of the second synchronized shift predicted temperature increase $T_{INH}$ in the step S41 of FIG. 13 will be described with reference to the flowchart in FIG. 19.

In a step S501, the relative rotation speed between the turbine rotation speed NT and the output rotation speed No is calculated.

In a step S502, a target transmission torque of the clutch to be disengaged is calculated.

In a step S503, a target shift period is calculated.

In a step S504, a predicted heat generation amount $T_{up}$ is calculated. The predicted heat generation amount $T_{up}$ is calculated by multiplying the relative rotation speed, the target transmission torque, and the target shift period.

Figure 22:
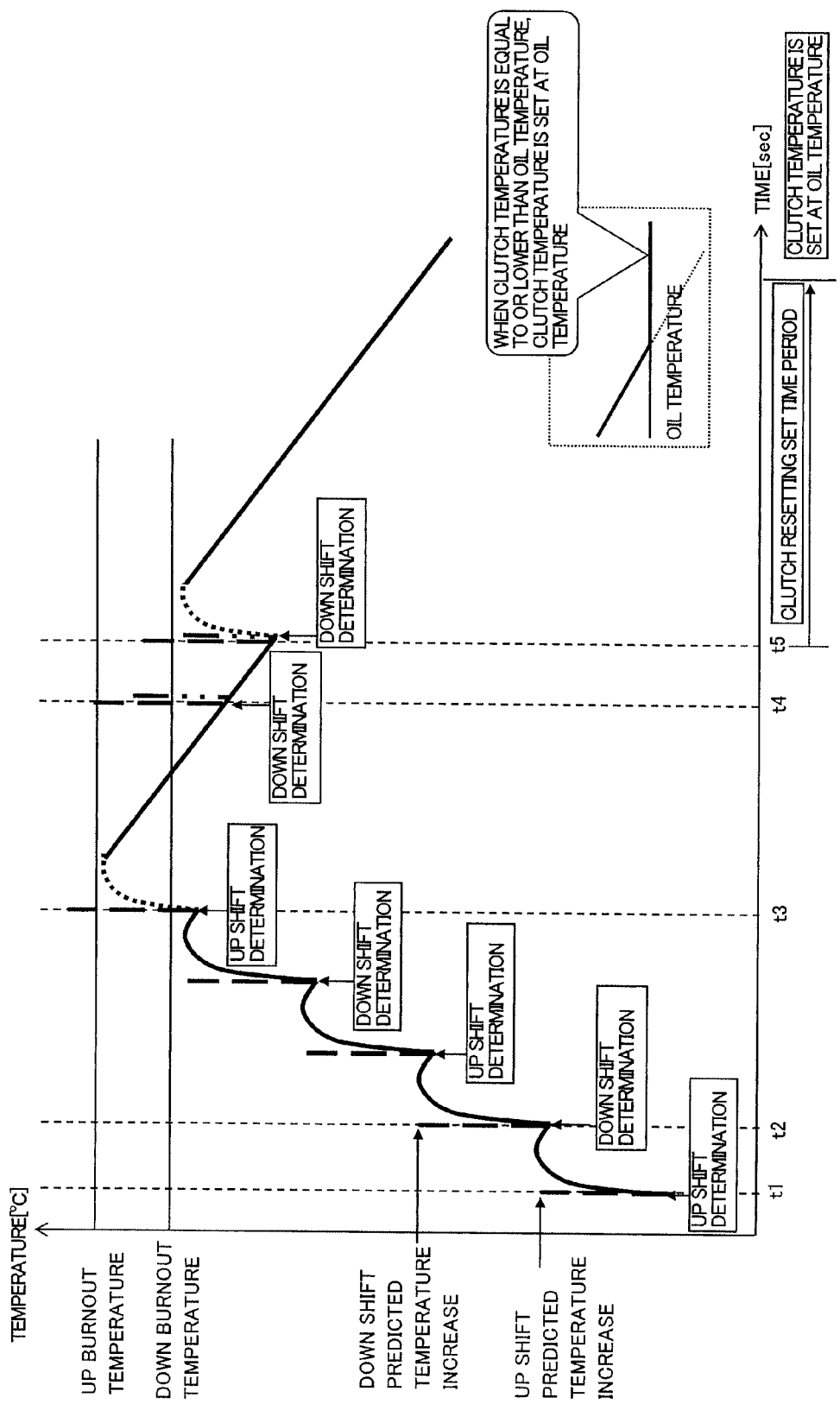
FIG. 22 is a time chart showing actions of the shift control device for an automatic transmission according to this embodiment.

Next, actions of the shift control device for an automatic transmission according to this embodiment will be described with reference to the time chart shown in FIG. 22. Unless otherwise indicated, the terms upshift and downshift are assumed to denote shifts performed in the normal shift mode, focusing on shift shock. FIG. 22 is a time chart showing temperature variation in a certain clutch, and illustrates a state in which upshifts and downshifts are repeated between the $n^{th}$ speed and the $n+1^{th}$ speed and heat radiation is performed after each shift.

When an UP shift command is issued at a time t1, the UP shift predicted temperature increase $T_{INH}$ is calculated, and since the predicted temperature $T_{ES}$ following an UP shift, which is obtained by adding the current clutch temperature Tc to the UP shift predicted temperature increase $T_{INH}$, does not exceed the UP burnout temperature, an upshift is performed.

When a downshift command is issued at a time t2, the DOWN shift predicted temperature increase $T_{INH}$ is calculated, and since the predicted temperature $T_{ES}$ following a downshift, which is obtained by adding the current clutch temperature Tc to the DOWN shift predicted temperature increase $T_{INH}$, does not exceed the DOWN burnout temperature, a downshift is performed.

Upshifts and downshifts are repeated in a similar manner thereafter, and when an upshift is determined at a time t3, the predicted temperature $T_{ES}$ following the upshift is calculated. Since this predicted temperature $T_{ES}$ exceeds the UP burnout temperature, a PYUP shift executed in the low heat generation amount is performed. As a result, the heat generation amount $T_{up}$ of the clutch decreases, and therefore burnout caused when the clutch temperature exceeds the UP burnout temperature is avoided.

Thereafter, the clutch enters the engagement steady state and gradually radiates heat. The heat radiation amount $T_{down}$ at this time, or in other words the temperature decrease gradient, is determined on the basis of the temperature difference between the clutch temperature immediately after an upshift performed from the time t3 onward and the oil temperature $T_{OIL}$.

When a downshift is determined at a time t4, the predicted temperature $T_{ES}$ following a downshift executed in the normal shift mode is calculated, and since this predicted temperature $T_{ES}$ exceeds the DOWN burnout temperature, the predicted temperature $T_{ES}$ following a PYDOWN shift executed in the low heat generation amount shift mode is calculated. However, the predicted temperature $T_{ES}$ following a PYDOWN shift also exceeds the DOWN burnout temperature, and therefore execution of the determined downshift is prohibited.

When a downshift is determined again at a time t5, the predicted temperature $T_{ES}$ following a downshift executed in the normal shift mode is calculated, and since this predicted temperature $T_{ES}$ exceeds the DOWN burnout temperature, the predicted temperature $T_{ES}$ following a PYDOWN shift is calculated. In this case, the predicted temperature $T_{ES}$ following a PYDOWN shift executed in the low heat generation amount shift mode does not exceed the DOWN burnout temperature, and therefore a PYDOWN shift is performed.

Thereafter, the clutch enters the disengagement steady state and gradually radiates heat. The heat radiation amount $T_{down}$ at this time, or in other words the temperature decrease gradient, is determined on the basis of the temperature difference between the clutch temperature immediately after a downshift performed from the time t5 onward and the oil temperature $T_{OIL}$.

When the clutch resetting set time period elapses after the time t5, or the clutch temperature falls to or below the oil temperature $T_{OIL}$, the clutch temperature is held at the oil temperature $T_{OIL}$ (a fixed value).

In the embodiment described above, the heat generation amount $T_{up}$ produced by a shift and the clutch temperature Tc upon completion of the shift are predicted before the start of the shift, and on the basis of the predicted clutch temperature Tc, either a normal shift or a PY shift is determined. In so doing, the shift tolerance can be increased, and deterioration of the drivability can be prevented. Further, when the predicted clutch temperature Tc exceeds a burnout temperature, a PYUP shift or a PYDOWN shift resulting in a smaller heat generation amount $T_{up}$ is performed. As a result, shifts that cannot be prohibited, such as an upshift for preventing over-revving, for example, can be executed in such a manner that the clutch does not burn.

Further, the time required to complete a PYUP shift is shorter than a shift performed in the normal shift mode at the same input torque, and therefore a corresponding reduction in the heat generation amount $T_{up}$ can be achieved, thereby suppressing reductions in the durability of the clutch.

Furthermore, when a PYUP shift is executed, the torque reduction amount of the engine torque is increased beyond that of an upshift performed in the normal shift mode. As a result, the heat generation amount $T_{up}$ can be reduced correspondingly, thereby suppressing reductions in the durability of the clutch and increases in shift shock.

In the case of a downshift, when the predicted clutch temperature following the shift is equal to or greater than the DOWN burnout temperature, the clutch temperature following a PYDOWN shift performed in the low heat generation amount shift mode is predicted. When the predicted temperature does not exceed the DOWN burnout temperature, a PYDOWN shift is performed. As a result, the downshift tolerance can be maximized without worsening the durability of the clutch.

Furthermore, when the predicted clutch temperature following completion of a PYDOWN shift exceeds the DOWN burnout temperature, a downshift is prohibited. In so doing, clutch burnout caused by heat generated when an upshift is performed after a downshift can be forestalled, and therefore reductions in the durability of the clutch can be suppressed.

Further, until the timer reaches a predetermined value, the temperature decrease gradient during heat radiation is set on the basis of the temperature difference between the clutch temperature Tc following completion of the shift and the oil temperature $T_{OIL}$, and when the timer reaches or exceeds the predetermined value, the temperature decrease gradient is set at a fixed predetermined gradient, regardless of the clutch temperature Tc following completion of the shift and the oil temperature $T_{OIL}$. Thus, in a region where the clutch temperature Tc is comparatively high from the beginning of heat radiation to the point at which the timer reaches the predetermined value, the estimation precision of the current temperature is improved such that deterioration of the drivability can be prevented. Further, after the timer has reached the predetermined value, the clutch temperature Tc is low and the temperature decrease gradient may be considered substantially constant, regardless of the clutch temperature Tc at the start of heat radiation. By employing a fixed predetermined gradient, the data volume can be reduced.

Furthermore, the temperature decrease gradient set on the basis of the temperature difference between the current clutch temperature Tc and the oil temperature $T_{OIL}$ is set to increase as the clutch temperature Tc upon shift completion rises, and therefore the current clutch temperature Tc can be calculated with a higher degree of precision.

Furthermore, the predetermined gradient is set at a smaller gradient than the temperature decrease gradient set on the basis of temperature difference between the current clutch temperature Tc and the oil temperature $T_{OIL}$, and therefore the current clutch temperature Tc can be calculated with a higher degree of precision.

Further, when the reset determination timer reaches or exceeds the clutch resetting set time period, the clutch temperature Tc is set at the oil temperature $T_{OIL}$. Here, when a certain amount of time has elapsed following the start of heat radiation, it may be determined that the clutch temperature Tc has fallen to a temperature in the vicinity of the oil temperature $T_{OIL}$, and therefore, in this case, calculation of the clutch temperature Tc is halted, enabling a reduction in the calculation load.

Further, when the calculated clutch temperature Tc falls to or below the oil temperature $T_{OIL}$, calculation is halted and the clutch temperature Tc is set at the oil temperature $T_{OIL}$, thereby preventing calculations according to which the clutch temperature Tc is lower than the oil temperature $T_{OIL}$, a result that is impossible in reality.

Further, the heat generation amount $T_{up}$ produced by a shift and the clutch temperature Tc upon completion of the shift are predicted before the start of the shift, and on the basis of the predicted clutch temperature Tc, a shift is either permitted or prohibited. In so doing, the shift tolerance can be increased, and deterioration of the drivability can be prevented. Further, the heat generation amount $T_{up}$ of the clutch during the shift is predicted on the basis of an average value of the transmission torque of the clutch and an average value of the relative rotation speed of the clutch, and therefore an improvement in prediction accuracy can be achieved while suppressing the calculation load in comparison with a case in which prediction is performed by integrating hydraulic data.

Furthermore, the vehicle speed, the turbine torque, the transmission torque of the clutch, and the relative rotation speed are predicted on the basis of the acceleration before the start of the shift, and moreover, the average value of the transmission torque of the clutch and the average value of the relative rotation speed of the clutch are also predicted. Hence, the data amount can be reduced, and data setting can be facilitated.

Moreover, during an upshift, an average value of the transmission torque of the inertia phase is calculated on the basis of the incline of the oil pressure supplied to the clutch at the start of the inertia phase and the target time period of the inertia phase, and therefore the calculation load can be reduced while maintaining prediction accuracy.

This application claims priority from Japanese Patent Application Nos. 2007-250245, 2007-250251 and 2007-250261 each were filed on Sep. 26, 2007, which are incorporated herein by reference in their entirety.

What is claimed is:

1. An automatic transmission comprising:
a shift mechanism that executes a shift from a current gear position to a target gear position by engaging or disengaging a plurality of frictional elements selectively;
a shift control unit which performs the shift in a first shift mode;
a current thermal load calculating unit which calculates a current thermal load state of a frictional element;
a first heat generation amount predicting unit which predicts, prior to start of the shift, a heat generation amount of the frictional element if the shift is performed in the first shift mode; and
a first thermal load predicting unit which predicts a thermal load state of the frictional element upon shift completion if the shift is performed in the first shift mode on a basis of the current thermal load state of the frictional element and the heat generation amount predicted by the first heat generation amount predicting unit,
wherein the shift control unit either performs the shift in a second shift mode, in which a heat generation amount is lower than that of the first shift mode, or prohibits the shift when the thermal load state upon shift completion predicted by the first thermal load predicting unit is inside a predetermined region.

2. The automatic transmission as defined in claim 1, wherein the shift is an upshift, and wherein a time required to complete the shift in the second shift mode is shorter than that of the first shift mode at an identical input torque.

3. The automatic transmission as defined in claim 2, further comprising a drive source torque reduction command outputting unit which outputs a command to a drive source to reduce an input torque inputted into the transmission from the drive source temporarily during the shift,
wherein a reduction amount in the input torque from the drive source is larger in the second shift mode than in the first shift mode.

4. The automatic transmission as defined in claim 1, wherein the shift is a downshift,
wherein the automatic transmission further comprises:
a second heat generation amount predicting unit which predicts, prior to the start of the shift, the heat generation amount of the frictional element if the shift is performed in the second shift mode when the thermal load state upon shift completion predicted by the first thermal load predicting unit is inside the predetermined region; and
a second thermal load predicting unit which predicts the thermal load state of the frictional element upon shift completion if the shift is performed in the second shift mode on a basis of the current thermal load state of the frictional element and the heat generation amount predicted by the second heat generation amount predicting unit, and
wherein the shift control unit performs the shift in the second shift mode when the thermal load state upon shift completion predicted by the first thermal load predicting unit is inside the predetermined region and the thermal load state upon shift completion predicted by the second thermal load predicting unit is outside the predetermined region.

5. The automatic transmission as defined in claim 4, wherein the shift control unit prohibits the shift when the thermal load state upon shift completion predicted by the second thermal load predicting unit is inside the predetermined region.

6. The automatic transmission as defined in claim 1, further comprising an oil temperature detecting unit for detecting an oil temperature of the automatic transmission, wherein the current thermal load calculating unit calculates the current thermal load state of the frictional element on a basis of a decrease gradient of the thermal load state of the frictional element and an elapsed time following shift completion, and wherein the decrease gradient is a first decrease gradient set on a basis of the thermal load state upon shift completion and the oil temperature from shift completion to an elapse of a first predetermined time period, and is a constant second decrease gradient regardless of the thermal load state upon shift completion and the oil temperature once the first predetermined time period has elapsed following shift completion.

7. The automatic transmission as defined in claim 6, wherein the first decrease gradient is set at a larger gradient as the thermal load state upon shift completion increases.

8. The automatic transmission as defined in claim 6, wherein the second decrease gradient is smaller than the first decrease gradient.

9. The automatic transmission as defined in claim 6, wherein the thermal load state is a temperature, and wherein the current thermal load calculating unit halts calculation of the thermal load state of the frictional element and sets the current thermal load state of the frictional element at a current oil temperature when a second predetermined time period, which is longer than the first predetermined time period, elapses following shift completion.

10. The automatic transmission as defined in claim 6, wherein the thermal load state is a temperature, and wherein the current thermal load calculating unit halts calculation of the thermal load state of the frictional element and sets the current thermal load state of the frictional element at a current oil temperature when the current thermal load state of the frictional element calculated by the current thermal load calculating unit falls to or below the oil temperature.

11. The automatic transmission as defined in claim 1, wherein the first heat generation amount predicting unit predicts the heat generation amount of the frictional element on a basis of an average value of a transmission torque of the frictional element and an average value of a relative rotation speed of the frictional element during the shift.

12. The automatic transmission as defined in claim 11, further comprising:

a vehicle speed predicting unit which predicts a vehicle speed at a start of a torque phase and a vehicle speed at a start of an inertia phase on a basis of an acceleration prior to the start of the shift;

a turbine torque predicting unit which predicts a turbine torque at the start of the torque phase and a turbine torque at the start of the inertia phase on a basis of the vehicle speed at the start of the torque phase and the vehicle speed at the start of the inertia phase;

a transmission torque predicting unit which predicts a transmission torque of the frictional element at the start of the torque phase and a transmission torque of the frictional element at the start of the inertia phase on a basis of the turbine torque at the start of the torque phase and the turbine torque at the start of the inertia phase; and a relative rotation speed predicting unit which predicts a relative rotation speed of the frictional element at the start of the torque phase and a relative rotation speed of the frictional element at the start of the inertia phase on a basis of the vehicle speed at the start of the torque phase and the vehicle speed at the start of the inertia phase, wherein the average value of the transmission torque of the frictional element during the shift is calculated on a basis of the transmission torque of the frictional element at the start of the torque phase and the transmission torque of the frictional element at the start of the inertia phase, and wherein the average value of the relative rotation speed of the frictional element is calculated on a basis of the relative rotation speed of the frictional element at the start of the torque phase and the relative rotation speed of the frictional element at the start of the inertia phase.

13. The automatic transmission as defined in claim 11, wherein, when the shift is an upshift, the average value of the transmission torque of the inertia phase is calculated on a basis of an incline of oil pressure supplied to the frictional element at a start of an inertia phase and a target time period of the inertia phase.

14. A shift control method for an automatic transmission that executes a shift from a current gear position to a target gear position by engaging or disengaging a plurality of frictional elements selectively, wherein the method comprises:

performing the shift in a first shift mode;

calculating a current thermal load state of a frictional element;

predicting, prior to a start of the shift, a heat generation amount of the frictional element if the shift is performed in the first shift mode; and predicting a thermal load state of the frictional element upon shift completion if the shift is performed in the first shift mode on a basis of the current thermal load state of the frictional element and the predicted heat generation amount; and performing the shift in a second shift mode, in which a heat generation amount is lower than that of the first shift mode, or prohibiting the shift when the predicted thermal load state is inside a predetermined region.

15. An automatic transmission comprising:

a shift mechanism that executes a shift from a current gear position to a target gear position by engaging or disengaging a plurality of frictional elements selectively;

shift control means for performing the shift in a first shift mode;

current thermal load calculating means for calculating a current thermal load state of a frictional element;

first heat generation amount predicting means for predicting, prior to a start of the shift, a heat generation amount of the frictional element if the shift is performed in the first shift mode; and first thermal load predicting means for predicting a thermal load state of the frictional element upon shift completion if the shift is performed in the first shift mode on a basis of the current thermal load state of the frictional element and the heat generation amount predicted by the first heat generation amount predicting means, wherein the shift control means either performs the shift in a second shift mode, in which a heat generation amount is lower than that of the first shift mode, or prohibits the shift when the thermal load state upon shift completion predicted by the first thermal load predicting means is inside a predetermined region.

* * * * *